(12) United States Patent
Yasaki et al.

(10) Patent No.: US 11,076,293 B2
(45) Date of Patent: Jul. 27, 2021

(54) ACCESS CONTROL DEVICE, COMPUTER-READABLE RECORDING MEDIUM STORING ACCESS CONTROL PROGRAM, AND ACCESS CONTROL SYSTEM

(71) Applicant: FUJITSU LIMITED, Kawasaki (JP)

(72) Inventors: Koichi Yasaki, Kawasaki (JP); Tadanobu Tsunoda, Yokohama (JP); Kazuaki Nimura, Kawasaki (JP); Hidenobu Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 343 days.

(21) Appl. No.: 16/364,697

(22) Filed: Mar. 26, 2019

(65) Prior Publication Data

US 2019/0306715 A1    Oct. 3, 2019

(30) Foreign Application Priority Data

Mar. 29, 2018    (JP) .............................. JP2018-063508

(51) Int. Cl.
*H04B 5/00* (2006.01)
*H04W 12/08* (2021.01)
(Continued)

(52) U.S. Cl.
CPC ......... *H04W 12/08* (2013.01); *H04W 12/041* (2021.01); *H04W 12/0431* (2021.01); *H04W 12/069* (2021.01); *H04W 4/80* (2018.02)

(58) Field of Classification Search
CPC ............ H04W 12/08; H04W 12/0431; H04W 12/069; H04W 4/80; H04W 12/041
(Continued)

(56) References Cited

U.S. PATENT DOCUMENTS

| | | | |
|---|---|---|---|
| 2006/0069911 A1* | 3/2006 | Takabayashi | H04L 63/08 713/150 |
| 2010/0024040 A1* | 1/2010 | Nimura | H04L 9/0618 726/26 |

(Continued)

FOREIGN PATENT DOCUMENTS

| | | |
|---|---|---|
| JP | 2002-140302 | 5/2002 |
| JP | 2004-334756 | 11/2004 |
| JP | 2014-215802 | 11/2014 |

*Primary Examiner* — April G Gonzales
(74) *Attorney, Agent, or Firm* — Fujitsu Patent Center

(57) ABSTRACT

An access control device includes a processor configured to: receive a request for a connection via wireless communication from a terminal, issue a password from a first device for supporting a reading scheme for the terminal in response to a reception of the request for the connection, and transmit, to the terminal, a first program for generating a key information item of the terminal and acquiring authentication data corresponding to the password read by the reading scheme for the terminal, receive a response including the key information item and the authentication data from the terminal and determine whether the terminal is authorized based on the authentication data included in the response, and associate the key information item included in the response with identification information of the terminal and execute a process of establishing the connection to the terminal when the processor determines that the terminal is authorized.

15 Claims, 22 Drawing Sheets

(51) Int. Cl.
  *H04W 12/041*  (2021.01)
  *H04W 12/069*  (2021.01)
  *H04W 12/0431* (2021.01)
  *H04W 4/80*    (2018.01)

(58) Field of Classification Search
  USPC ........................................................ 455/41.1
  See application file for complete search history.

(56) References Cited

U.S. PATENT DOCUMENTS

| | | | |
|---|---|---|---|
| 2016/0286591 A1* | 9/2016 | Yasaki | ................ H04W 12/069 |
| 2017/0264615 A1* | 9/2017 | Yasaki | .................... H04L 63/08 |
| 2018/0048471 A1* | 2/2018 | Yasaki | .................... G06F 21/35 |
| 2018/0115546 A1* | 4/2018 | Ito | ........................... H04L 63/06 |
| 2020/0178080 A1* | 6/2020 | Yasaki | ................. H04L 9/3268 |

* cited by examiner

| | TYPE | READING SCHEME | PROGRAM | ATTRIBUTE | ID |
|---|---|---|---|---|---|
| 600-1 | firstPrg | PROJECTOR | inputSign.html | — | — |
| 600-2 | firstPrg | NFC | inputNFC.html | — | — |
| | ... | ... | ... | ... | ... |
| 600-3 | authPrg | — | Index.html.none1 | none | 1 |
| 600-4 | authPrg | — | Index.html.none2 | none | 2 |
| 600-5 | authPrg | — | Index.html.face1 | face | 1 |
| 600-6 | authPrg | — | Index.html.face1 | face | 2 |
| | ... | ... | ... | ... | ... |

ACCESS CONTROL DEVICE, COMPUTER-READABLE RECORDING MEDIUM STORING ACCESS CONTROL PROGRAM, AND ACCESS CONTROL SYSTEM

CROSS-REFERENCE TO RELATED APPLICATION

This application is based upon and claims the benefit of priority of the prior Japanese Patent Application No. 2018-63508, filed on Mar. 29, 2018, the entire contents of which are incorporated herein by reference.

FIELD

The embodiments discussed herein are related to an access control device, a computer-readable recording medium storing an access control program, and an access control system.

BACKGROUND

In recent years, in school environments such as elementary and junior high schools, the introduction of classes in which information and communication technology (ICT) utilizing tablet terminals is used has been promoted. However, in such school environments, when a school database is accessed by a terminal impersonating a teacher's terminal, personal information, school grade information, and the like of students may be stolen. It is, therefore, important to take measures to inhibit unauthorized access.

As a related-art technique, for example, a mobile communication terminal is connected to a mobile router via near field communication (NFC), and authentication is executed by crosschecking the identifier of the mobile communication terminal or the like, and when the authentication is successful, the mobile communication terminal is used and communicates with a business server via the mobile router. In addition, there is a technique for checking whether or not a home server and a client terminal have shared access to the same physical medium within a short time period, thereby identifying whether or not the home server and the client terminal are connected to the same home network. Furthermore, there is a technique for comparing predetermined information output to a second terminal device with the predetermined information returned from a first terminal device and determining whether the first terminal device is authorized based on the result of the comparison.

Examples of related art are Japanese Laid-open Patent Publication No. 2014-215802, Japanese Laid-open Patent Publication No. 2004-334756, and Japanese Laid-open Patent Publication No. 2002-140302.

SUMMARY

According to an aspect of the embodiments, an access control device includes a memory; and a processor coupled to the memory and the processor configured to: receive a request for a connection via wireless communication from a terminal, issue a password from a first device for supporting a reading scheme for the terminal in response to a reception of the request for the connection, and transmit, to the terminal, a first program for generating a key information item of the terminal and acquiring authentication data corresponding to the password read by the reading scheme for the terminal, receive a response including the key information item and the authentication data from the terminal and determine whether the terminal is authorized based on the authentication data included in the response, and associate the key information item included in the response with identification information of the terminal and execute a process of establishing the connection to the terminal when the processor determines that the terminal is authorized.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the related-art techniques, in order to take measures to inhibit unauthorized access, it takes efforts and time to set certificates or the like for authentication of users. For example, in elementary and junior high schools, in the case where homeroom teachers of classes set certificates in terminals to be used by students in advance, the burden on the teachers is large.

Hereinafter, an access control device disclosed herein, a computer-readable recording medium disclosed herein and storing an access control program, and an access control system disclosed herein are described in detail with reference to the accompanying drawings.

First Embodiment

Figure 1:
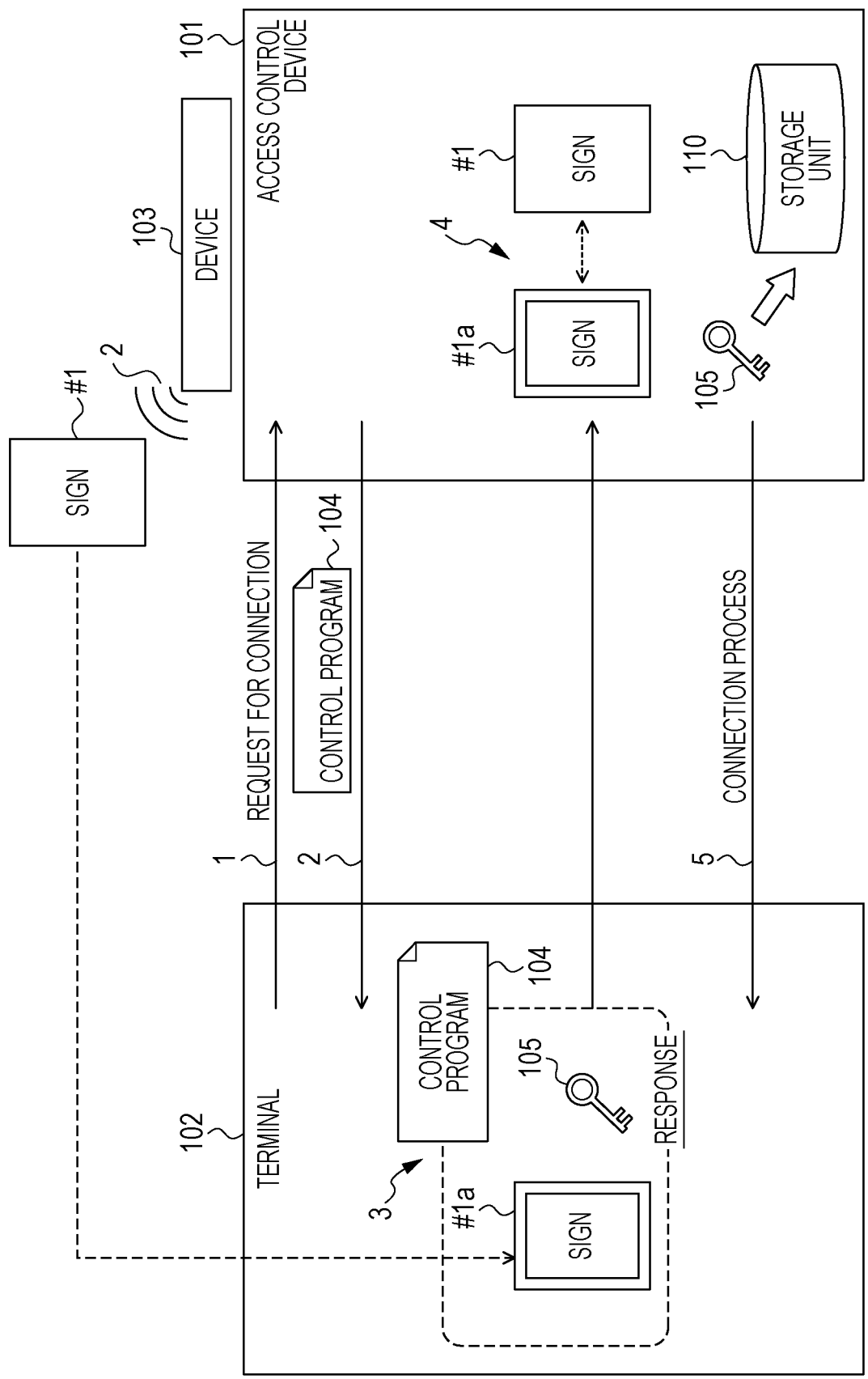
FIG. 1 is an explanatory diagram illustrating an example of an access control method according to a first embodiment.

FIG. 1 is an explanatory diagram illustrating an example of an access control method according to a first embodiment. In FIG. 1, an access control device 101 is a computer configured to control access to a network connected to a terminal 102. The network is, for example, a local area network (LAN), a wide area network (WAN), the Internet, or the like. The terminal 102 may include a handover function.

The access control device 101 is, for example, an access point of a wireless LAN. The terminal 102 is a computer to be used by a user. The terminal 102 is, for example, a tablet personal computer (PC), a notebook PC, a smartphone, or the like. The user is, for example, a student, an elementary school child, a teacher, or the like of an elementary school, a junior high school, or the like.

In a school environment such as an elementary or junior high school, a service set identifier (SSID) password and Media Access Control (MAC) addresses are checked in authentication in the wireless LAN in many cases. The SSID password is common to terminals.

It is, therefore, difficult to manage the SSID password without the leakage of the SSID password to elementary school children and students.

As measures taken to inhibit unauthorized access, it is considered that the access point uses terminal-specific certificates (tokens) to detect the falsification of a MAC address upon a connection to the wireless LAN, for example. According to the measures, when a MAC address of a terminal is changed to another MAC address and a certificate (token) is incorrect, the access point may detect the falsification of the MAC address to remove the impersonating terminal.

Certificates (tokens), however, are set in corresponding terminals. Thus, in a school environment such as an elementary or junior high school, when school staff (for example, homeroom teachers of classes) performs operations of setting certificates in all terminals to be used by students, the burden on the school staff due to the operations of the settings is large.

It is considered that a system engineer (SE) performs the operations of setting the certificates in the terminals in the initial introduction, instead of the school staff. However, persons belonging to the school environment or the school staff add terminals, remove terminals, update the certificates, and the like during an operation, and the burden on the school staff due to the operations of setting and updating the certificates is large.

In addition, it is considered that a program for causing the terminals to acquire the certificates is introduced to reduce the burden caused by the operations of setting the certificates on the school staff. For example, the school staff installs the program in the terminals from a CD-ROM or the like, executes the program, establishes temporal connections between the terminals and the access point via Bluetooth or the like, and causes the terminals to acquire the certificates from the access point.

In this method, although the operations to be performed by the school staff are simplified, it takes efforts to set the temporal connections of the terminals to the access point and install the program in the terminals and, burden rests on the school staff. The CD-ROM is an abbreviation of compact disc read only memory. Bluetooth is a trademark.

The first embodiment describes an access control method of reducing burden caused by an operation of setting in a terminal in order to inhibit unauthorized access. An example of a process to be executed by the access control device 101 and the terminal 102 is described below.

Reference numeral 1 indicates that the access control device 101 receives a request for a connection from the terminal 102 via wireless communication. In this case, the request for the connection is received from the terminal 102 via the wireless communication in order to connect the terminal 102 to a network such as a LAN or a WAN via the access control device 101.

Reference numeral 2 indicates that the access control device 101 issues a sign from a device 103 supporting a reading scheme for the terminal 102 in response to the reception of the request for the connection from the terminal 102 via the wireless communication and transmits a control program 104 to the terminal 102.

The reading scheme is a scheme of reading the sign. The "sign" is information issued to execute authentication on the terminal 102. The reading scheme for the terminal 102 may be determined in advance and associated with the terminal 102 or may be selected when the access control device 101 receives the request for the connection from the terminal 102.

The control program 104 generates a key information item of the terminal 102 and acquires authentication data corresponding to the sign read by the reading scheme for the terminal 102. The key information item of the terminal 102 is, for example, a pair of public and secret keys to be used to execute authentication on the terminal 102.

As an example, it is assumed that the device 103 is a projector, the reading scheme for the terminal 102 is a scheme of reading the sign displayed by the device 103 and entered by an entry operation of a user of the terminal 102 in response to the reception of the entered sign. The reading scheme is, for example, 1) a NFC Touch, 2) a bluetooth scan, or the like, 3) letters projected by a projector and read by a student, and values of the letters inputted to a terminal. In addition, it is assumed that the sign is a "password" that is authentication data to be used to execute authentication on the terminal 102. As used herein, a "password" may be a string of characters used for authentication.

In this case, the user of the terminal 102 sees the sign (password) displayed on a chalkboard or the like by the device 103 (projector) and enters the password in the terminal 102. The example illustrated in FIG. 1 assumes that a sign #1 serving as the password is issued from the device 103.

Reference numeral 3 indicates that the terminal 102 executes the control program 104 upon receiving the control program 104 from the access control device 101. By executing the control program 104, the terminal 102 generates a key information item of the terminal 102 and acquires authentication data based on the sign read by the reading scheme for the terminal 102. Then, the terminal 102 transmits, to the access control device 101, a response including the generated key information item and the acquired authentication data.

The example illustrated in FIG. 1 assumes that a key information item 105 (pair of public and secret keys) of the terminal 102 is generated as a result of the execution of the control program 104 by the terminal 102, and a sign #1*a* is entered as a password by an entry operation of the user of the terminal 102. In this case, the terminal 102 acquires the entered sign #1*a* as the authentication data. Then, the terminal 102 transmits, to the access control device 101, a response including the key information item 105 (only including the public key) and the sign #1*a*.

Reference numeral 4 indicates that the access control device 101 determines whether the terminal 102 is authorized based on the authentication data included in the response upon receiving the response including the key information item and the authentication data from the terminal 102. When the terminal 102 is authorized, the user of the terminal 102 corresponds to an authorized user who is permitted to use the network via the access control device 101.

For example, the access control device 101 compares the authentication data included in the response with the sign issued from the device 103. When the authentication data matches the sign, the access control device 101 determines that the terminal 102 is authorized. When the authentication data does not match the sign, the access control device 101 determines that the terminal 102 is not authorized.

The example illustrated in FIG. 1 assumes that the sign #1*a* included in the response from the terminal 102 matches the sign #1 issued from the device 103. The user of the terminal 102 is a person who has seen the sign #1 displayed on the chalkboard or the like by the device 103 (projector) and has accurately entered the password (sign #1*a*) in the terminal 102. In this case, the access control device 101 determines that the terminal 102 is authorized.

Reference numeral 5 indicates that when the terminal 102 is authorized, the access control device 101 associates the key information item included in the response with identification information of the terminal 102 and registers the associated key information item and the associated identification information. When the access control device 101 determines that the terminal 102 is authorized, the access control device 101 executes a connection process of establishing a connection between the access control device 101 and the terminal 102. When the connection process is normally completed, the terminal 102 is permitted to access the network via the access control device 101.

In the example illustrated in FIG. 1, the access control device 101 associates the key information item 105 (only including the public key) of the terminal 102 with the identification information of the terminal 102 and stores the associated key information item 105 and the associated identification information in a storage unit 110. Then, the access control device 101 executes the connection process of establishing the connection between the access control device 101 and the terminal 102. The key information item 105 (only including the public key) of the terminal 105 is used to execute authentication on the terminal 102 in the next and later connection of the terminal 102.

The access control device 101 may distribute the control program 104 to the terminal 102 that has transmitted the request for the connection. Then, the access control device 101 may cause the terminal 102 to automatically generate the key information item of the terminal 102 and the authentication data of the terminal 102. Thus, an operation of setting a certificate or the like in the terminal 102 may not be performed, and a load caused by the operation of setting the certificate or the like in the terminal 102 in order to inhibit unauthorized access may be reduced.

Example of Configuration of Access Control System 200

The following describes the case where the access control device 101 illustrated in FIG. 1 is applied to an access point of a wireless LAN in a school environment such as an elementary or junior high school.

Figure 2:
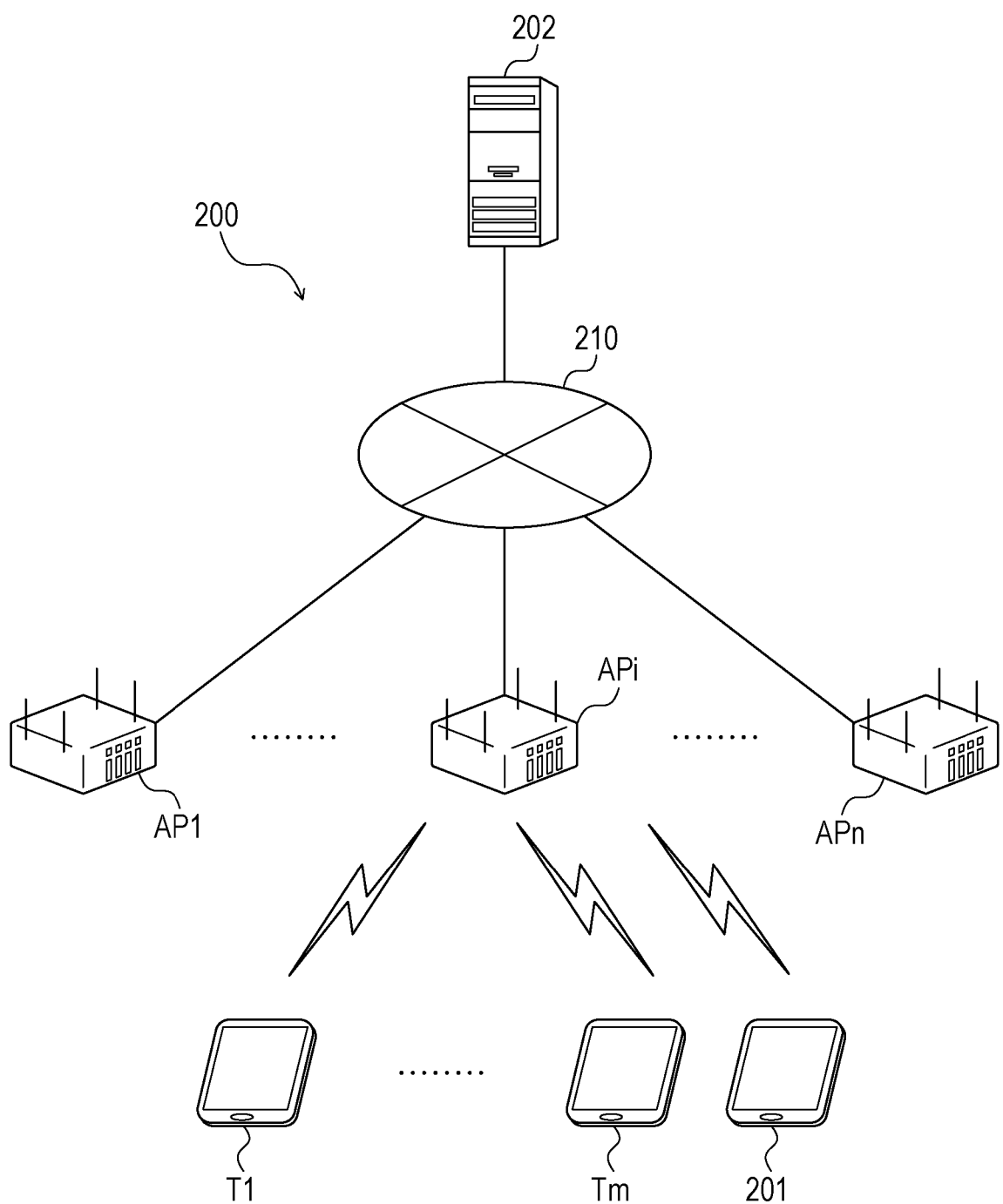
FIG. 2 is an explanatory diagram illustrating an example of a configuration of an access control system.

FIG. 2 is an explanatory diagram illustrating an example of a configuration of an access control system 200. In FIG. 2, the access control system 200 includes access control devices AP1 to APn (n is a natural number of 2 or more), terminals T1 to Tm (m is a natural number of 2 or more), a manager terminal 201, and a server 202. In the access control system 200, the access control devices AP1 to APn and the server 202 are connected to each other via a network 210. The network 210 is, for example, a LAN, a WAN, the Internet, or the like.

Hereinafter, an arbitrary access control device among the access control devices AP1 to APn is referred to as "access control device APi (i=1, 2, . . . , n) in some cases, and an arbitrary terminal among the terminals T1 to Tm is referred to as terminal Tj (j=1, 2, . . . , m) in some cases.

The access control devices APi are computers configured to control access of the terminals Tj to the network 210 via the access control devices APi. The access control device 101 illustrated in FIG. 1 corresponds to an access control device APi, for example. The access control devices AP1 to APn are, for example, installed in rooms (classrooms, a laboratory, a school staff room, and the like) in a school.

The terminals Tj are computers to be used by students. The manager terminal 201 is a computer to be used by a teacher. The terminals Tj and the manager terminal 201 are, for example, tablet PCs, notebook PCs, smartphones, or the like. The terminal 102 illustrated in FIG. 1 corresponds to a terminal Tj, for example.

The server 202 is a computer configured to provide various services. The server 202 is, for example, a database server configured to store teaching material information to be used for classes and confidential information such as personal information, school grade information, and the like of students.

In the access control system 200, the terminals T1 to Tn and the manager terminal 201 are connected to an access control device APi via a wireless network of a wireless LAN. When the terminals T1 to Tn and the manager terminal 201 normally complete a process of establishing connections to the access control device APi, the terminals T1 to Tn and the manager terminal 201 may access the network 210 via the access control device APi.

For example, the terminals T1 to Tn may access the server 202 via the network 210 and acquire the teaching material information of the classes. In addition, the manager terminal 201 may access the server 202 via the network 210 and browse the confidential information such as the personal information, school grade information, and the like of the students.

Example of Hardware Configurations of Access Control Devices APi

Figure 3:
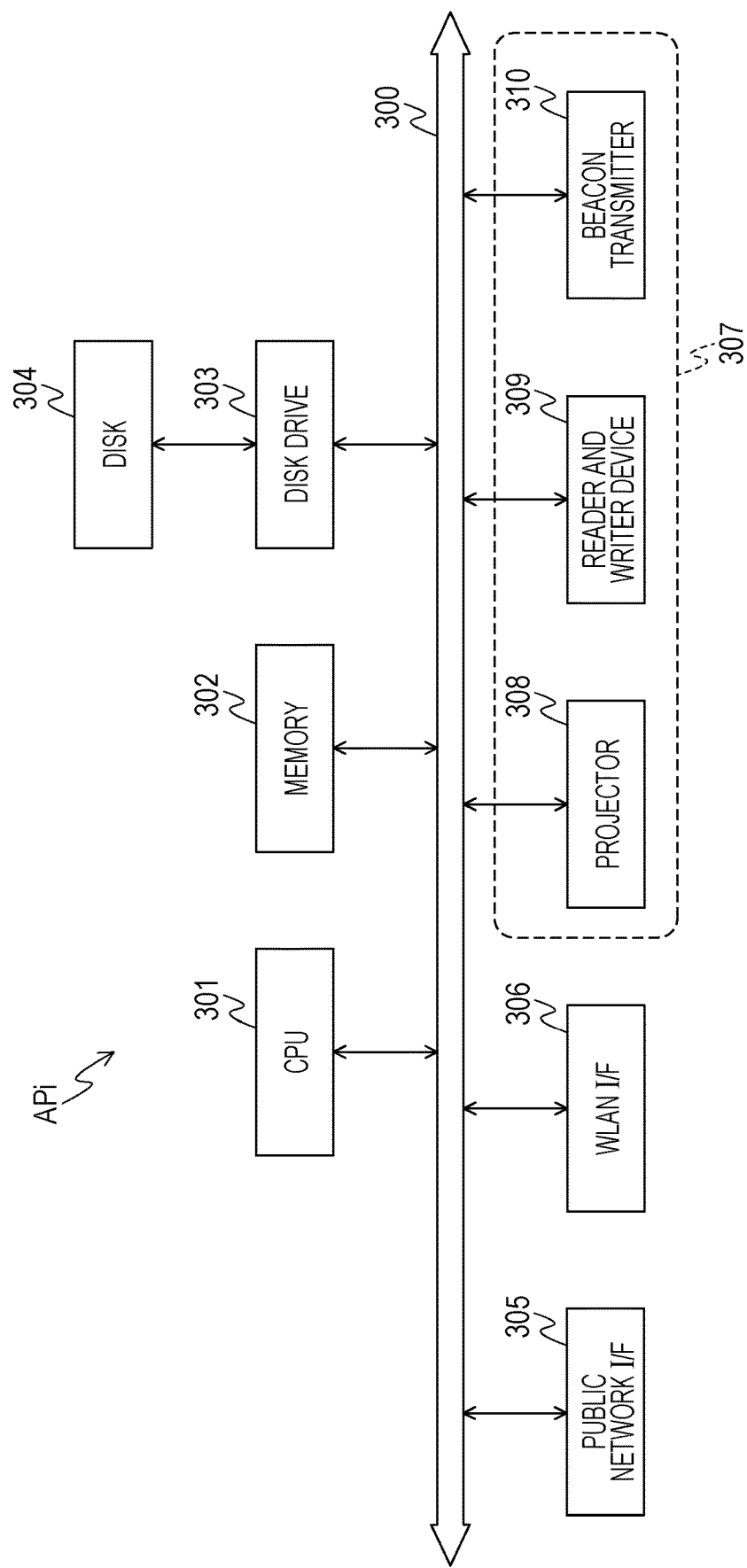
FIG. 3 is a block diagram illustrating an example of a hardware configuration of an access control device.

FIG. 3 is a block diagram illustrating an example of a hardware configuration of an access control device APi. In FIG. 3, the access control device APi includes a central processing unit (CPU) 301, a memory 302, a disk drive 303, a disk 304, a public network interface (I/F) 305, a WLAN I/F 306, and devices 307. The constituent units 301 to 307 are connected to each other via a bus 300.

The CPU 301 controls the entire access control device APi. The CPU 301 may include multiple cores. The memory 302 includes a ROM, a random access memory (RAM), and a flash ROM, for example. For example, the flash ROM and the ROM store various programs, while the RAM is used as a work area of the CPU 301. The programs stored in the memory 302 are loaded in the CPU 301, whereby coded processes are executed by the CPU 301.

The disk drive 303 controls reading and writing of data from and to the disk 304 in accordance with control by the CPU 301. The disk 304 stores data written in accordance with control by the disk drive 303. The disk 304 is, for example, a magnetic disk, an optical disc, or the like.

The public network I/F 305 is connected to the network 210 via a communication line and connected to another device (for example, the server 202 illustrated in FIG. 2) via the network 210. The public network I/F 305 serves as an interface between the network 210 and the inside of the access control device APi and controls input and output of data from and to the other device.

The WLAN I/F 306 is connected to the wireless network of the wireless LAN and connected to other devices (for example, the terminals T1 to Tm illustrated in FIG. 2 and the manager terminal 201 illustrated in FIG. 2) via the wireless network. The WLAN I/F 306 serves as an interface between the wireless network and the inside of the access control device APi and controls input and output of data from and to the other devices.

Each of the devices 307 is configured to issue a sign. The devices 307 are, for example, a projector 308, a reader and writer device 309, a beacon transmitter 310, and the like. The projector 308 is a device configured to project and display an image on a screen or the like. Instead of the projector 308, a display may be used. The reader and writer device 309 is configured to write and read data via near field communication (NFC) whose communication range is smaller than that of wireless communication in the wireless LAN. The reader and writer device 309 is, for example, an NFC reader and writer device. The beacon transmitter 310 is a device configured to transmit a beacon signal via NFC whose communication range is smaller than that of the wireless communication in the wireless LAN. For example, the beacon transmitter 310 uses a Bluetooth Low Energy (BLE) advertising signal as a beacon signal.

The access control device APi may further include a solid state drive (SSD), an input device, and a display. The devices 307 may be separated from the access control device APi. The server 202 illustrated in FIG. 2 may be enabled by the same configuration as the access control device APi. The server 202 may not include a WLAN I/F 306 and devices 307.

Example of Hardware Configurations of Terminals Tj

Figure 4:
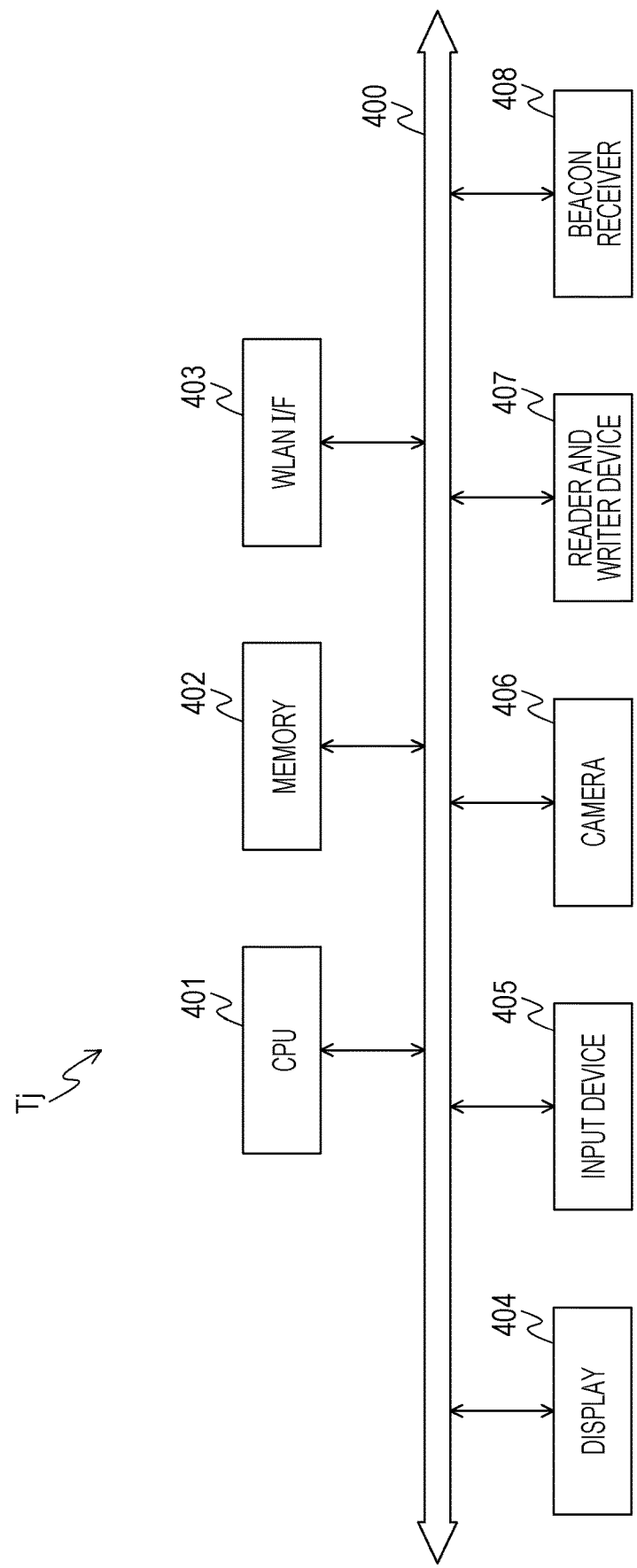
FIG. 4 is a block diagram illustrating an example of a hardware configuration of a terminal.

FIG. 4 is a block diagram illustrating an example of a hardware configuration of a terminal Tj. In FIG. 4, the terminal Tj includes a CPU 401, a memory 402, a WLAN I/F 403, a display 404, an input device 405, a camera 406, a reader and writer device 407, and a beacon receiver 408. The constituent units 401 to 408 are connected to each other via a bus 400.

The CPU 401 controls the entire terminal Tj. The CPU 401 may include multiple cores. The memory 402 includes a ROM, a RAM, and a flash ROM, for example. For example, the flash ROM and the ROM store various programs, while the RAM is used as a work area of the CPU 401. The programs stored in the memory 402 are loaded in the CPU 401, whereby coded processes are executed by the CPU 401.

The WLAN I/F 403 is connected to the wireless network of the wireless LAN and connected to other devices (for example, the access control devices AP1 to APn illustrated in FIG. 2) via the wireless network. The WLAN I/F 403 serves as an interface between the wireless network and the inside of the terminal Tj and controls input and output of data from and to the other devices.

The display 404 displays data such as an icon, a toolbox, a document, an image, and function information. The display 404 is, for example, a liquid crystal display, an organic electroluminescence (EL) display, or the like.

The input device 405 has keys to input characters, numbers, various instructions, and the like and is configured to input data. The input device 405 may be a touch panel input pad, a numeric keypad, a keyboard, a mouse, or the like.

The camera 406 is an imaging device configured to capture an image (still image or video image) and output image information. The reader and writer device 407 is configured to write and read data via NFC. The reader and writer device 407 is, for example, an NFC reader and writer device. The beacon receiver 408 is a device configured to receive a beacon signal via NFC and use a BLE advertising signal as a beacon signal.

The terminal Tj may further include a hard disk drive (HDD), a solid state drive (SSD), and a public network I/F, for example. The manager terminal 201 illustrated in FIG. 2 may be enabled by the same configuration as the terminal Tj.

Details Stored in Sign Management DB 500

Next, details stored in a sign management database (DB) 500 included in the access control device APi are described. The sign management DB 500 is, for example, enabled by a storage device that is the memory 302, disk 304, or the like of the access control device APi illustrated in FIG. 3.

Figure 5:
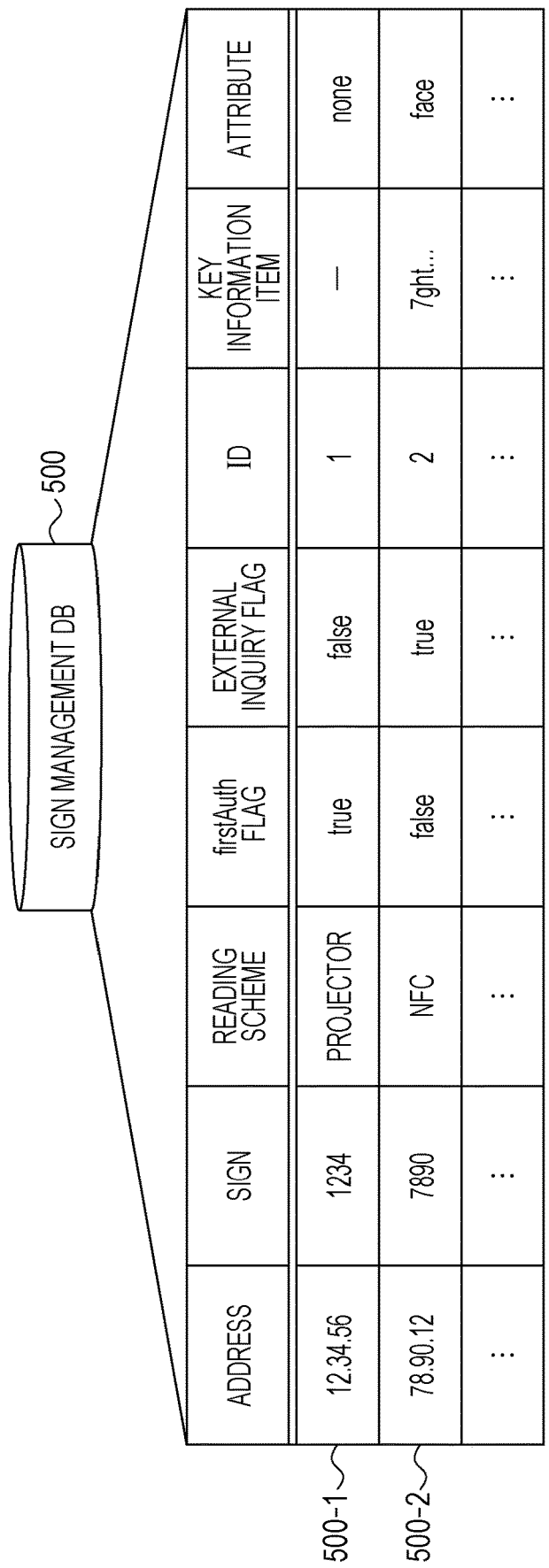
FIG. 5 is an explanatory diagram illustrating an example of details stored in a sign management DB.

FIG. 5 is an explanatory diagram illustrating an example of the details stored in the sign management DB 500. In FIG. 5, the sign management DB 500 includes fields for addresses, signs, reading schemes, firstAuth flags, external inquiry flags, IDs, key information items, and attributes. By setting information in the fields, sign management information (for example, sign management information 500-1 and 500-2) is stored as records.

The addresses are addresses of the terminals Tj. The addresses are, for example, MAC addresses of the terminals Tj. The signs indicate signs issued from the devices 307 supporting reading schemes for the terminals Tj. The reading schemes indicate schemes of reading the signs. The reading schemes are, for example, a projector, NFC, a beacon, and the like.

Each of the firstAuth flags indicates whether or not authentication is initial authentication. In each record in the field for firstAuth flags, true or false is set. A firstAuth flag indicating "true" indicates initial authentication. A firstAuth flag indicating "false" indicates second or later authentication.

Each of the external inquiry flags indicates whether or not a corresponding terminal transmits an inquiry to an external terminal. In each record in the field for external inquiry flags, true or false is set. An external inquiry flag indicating "true" indicates that a corresponding terminal transmits an inquiry to an external terminal. An external inquiry flag indicating "false" indicates that a corresponding terminal does not transmit an inquiry to an external terminal.

The IDs are identifiers identifying key information items. For example, when a single key information item is used for a single terminal Tj, a single ID is associated with the single terminal Tj. When key information items different for periods (units of a schedule) are used for a terminal Tj, IDs associated with the terminal Tj are different for the periods. In addition, an ID common to all students may be assigned to key information items of the same period. For example, as an ID of a key information item of a first period, an ID "1" common to all the students is set. In this case, a key information item of a terminal Tj is uniquely identified by a combination of an address and an ID.

The key information items are public keys to be used to execute authentication on the terminals Tj. The attributes are information indicating whether or not facial authentication is to be executed. In each record in the field for attributes, none or face is set. An attribute "none" indicates that the facial authentication is not to be executed. An attribute "face" indicates that the facial authentication is to be executed.

Details Stored in Program DB 600

Next, details stored in a program DB 600 included in the access control device APi are described. The program DB 600 is, for example, enabled by a storage device that is the memory 302, disk 304, or the like of the access control device APi illustrated in FIG. 3.

Figure 6:
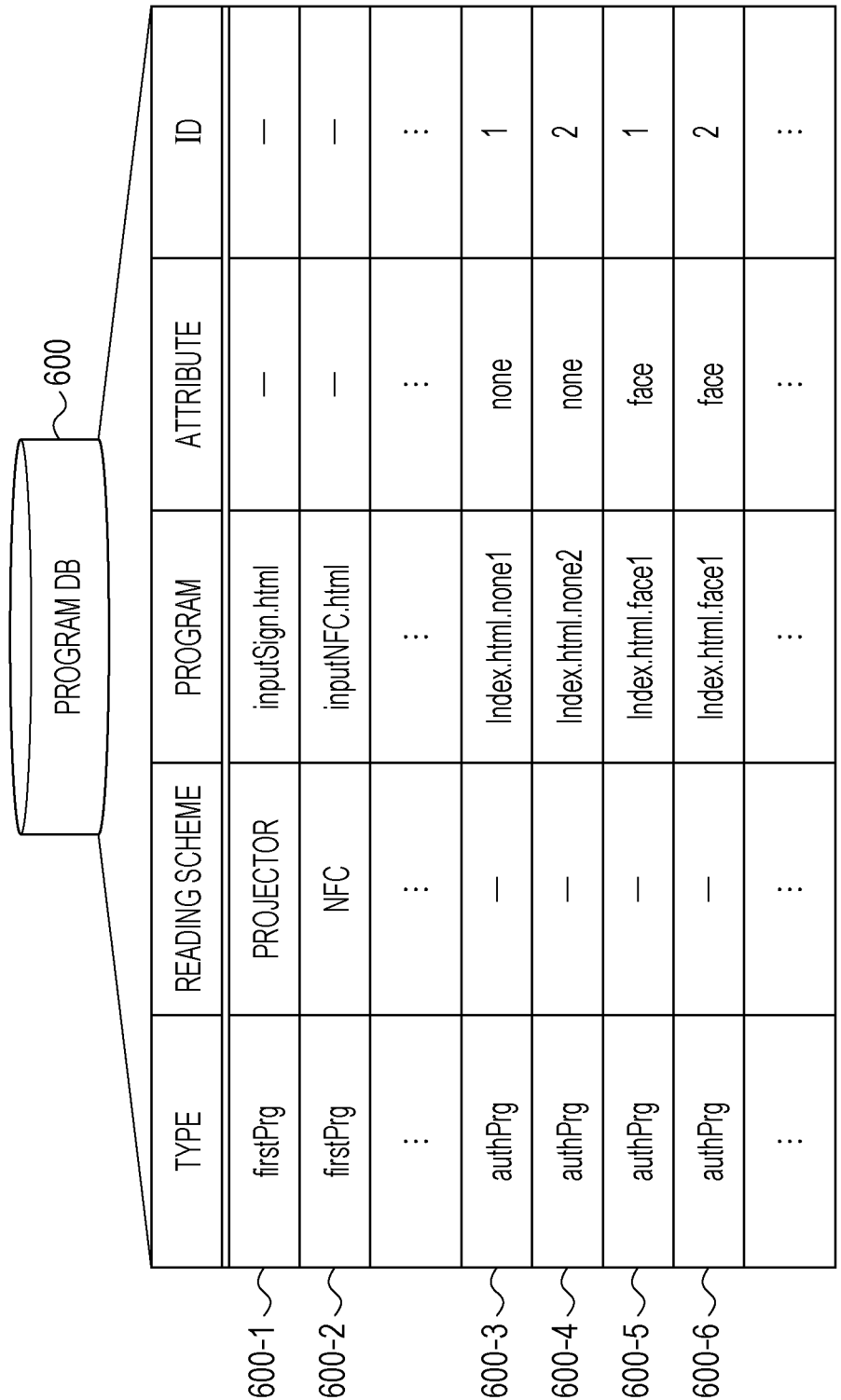
FIG. 6 is an explanatory diagram illustrating an example of details stored in a program DB.

FIG. 6 is an explanatory diagram illustrating an example of the details stored in the program DB 600. In FIG. 6, the program DB 600 includes fields for types, reading schemes, programs, attributes, and IDs. By setting information in the fields, program information (for example, program information 600-1 to 600-6) is stored as records.

The types indicate types of control programs. In each record in the field for types, firstPrg or authPrg is set. The type "firstPrg" indicates a control program Prg1 to be used for initial authentication. The type "authPrg" indicates a control program Prg2 to be used for second and later authentication. The reading schemes indicate schemes of reading signs. The programs indicate the control programs. The attributes are information indicating whether or not the facial authentication is to be executed. The IDs are identifiers identifying key information items.

Details Stored in Key Management DB 700

Next, details stored in a key management DB 700 included in a terminal Tj are described. The key management DB 700 is, for example, enabled by the memory 402 of the terminal Tj illustrated in FIG. 4.

Figure 7:
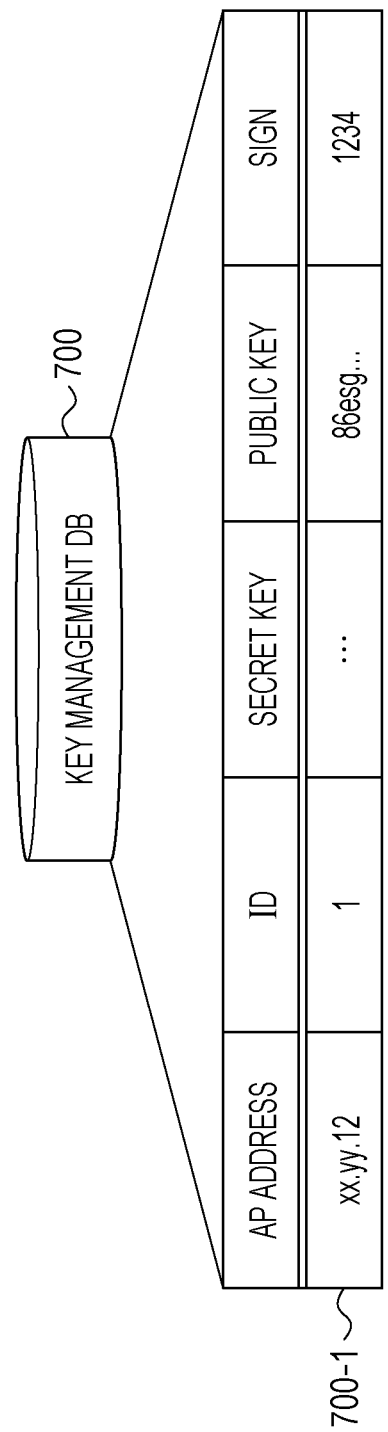
FIG. 7 is an explanatory diagram illustrating an example of details stored in a key management DB.

FIG. 7 is an explanatory diagram illustrating an example of the details stored in the key management DB 700. In FIG. 7, the key management DB 700 includes fields for an AP address, an ID, a secret key, a public key, and a sign. By setting information in the fields, key management information (for example, key management information 700-1) is stored as a record.

The AP address is an address of an access control device APi. The AP address is, for example, a MAC address of the access control device APi. The ID is an identifier identifying a key information item. The secret key is associated with the ID. The public key is associated with the ID. The sign is acquired in the generation of the key information item (or a pair of the public key and the secret key) associated with the ID.

Example of Screen of Sign Entry Screen 800

Next, an example of a sign entry screen 800 displayed on a display 404 of the terminal Tj is described. The following describes the case where user operations of selecting a box, a button, and the like displayed on an operational screen are touch operations.

Figure 8:
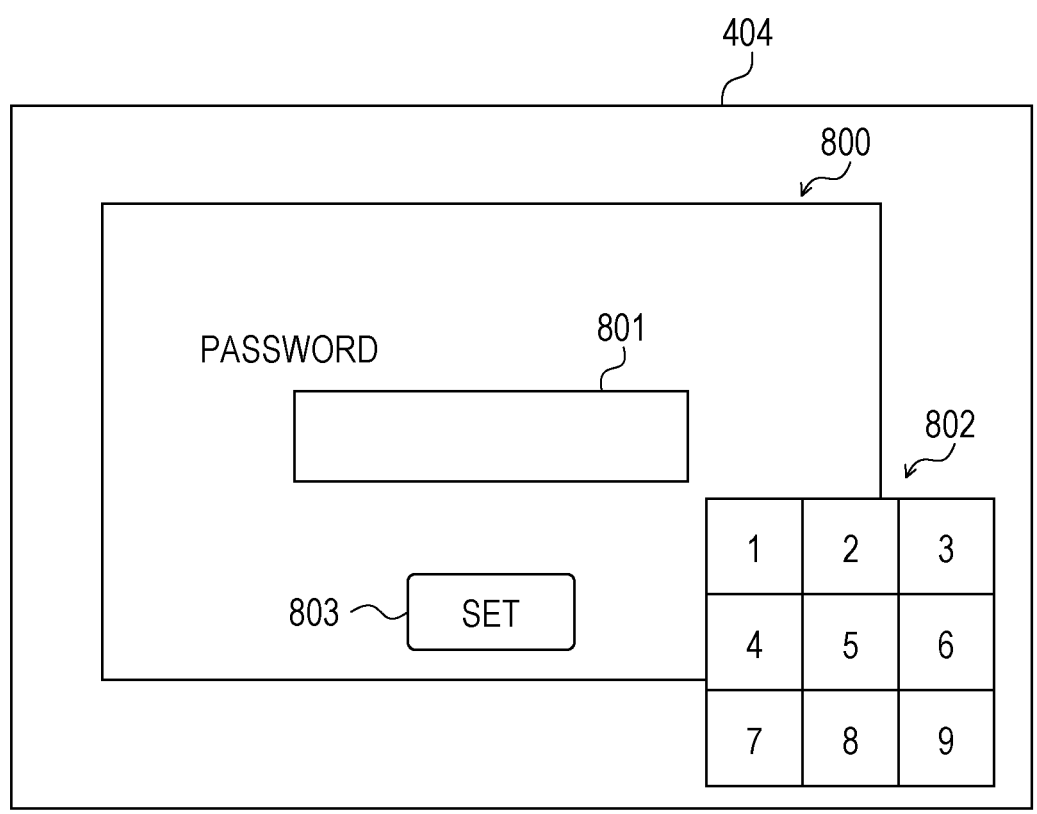
FIG. 8 is an explanatory diagram illustrating an example of a sing entry screen.

FIG. 8 is an explanatory diagram illustrating an example of the sign entry screen 800. In FIG. 8, the sign entry screen 800 is an operational screen for entering a sign. The sign to be entered is a "password" that is authentication data to be used to execute authentication on the terminal Tj.

When a box 801 displayed on the sign entry screen 800 is touched by an input operation of a user using, for example, the input device 405 illustrated in FIG. 4, the user may enter a sign. In this case, the user may enter the sign by operating a numeric key 802 displayed on the sign entry screen 800.

When a button 803 displayed on the sign entry screen 800 is touched, the password entered in the box 801 is set. In this case, when the button 803 is touched, the password (sign) entered in the box 801 is acquired as the authentication data to be used to execute authentication on the terminal Tj.

Example of Reading-in-Progress Screen 900

Next, an example of a reading-in-progress screen 900 displayed on the display 404 of the terminal Tj is described.

Figure 9:
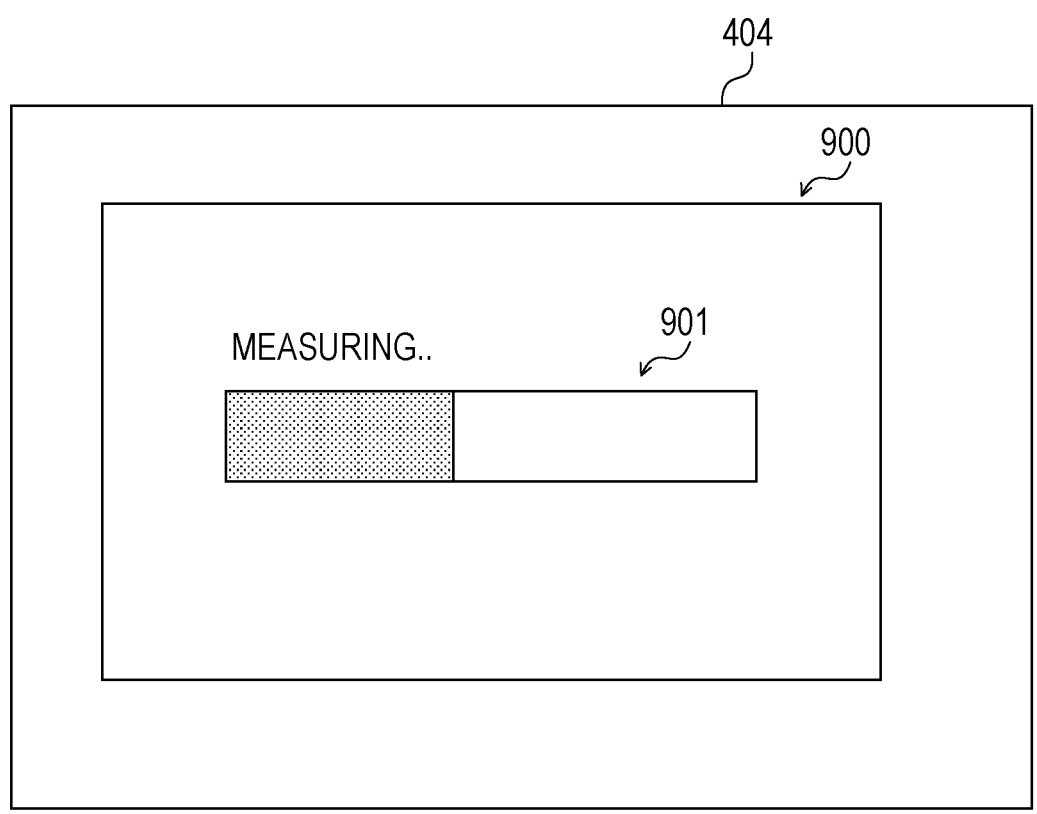
FIG. 9 is an explanatory diagram illustrating an example of a reading-in-progress screen.

FIG. 9 is an explanatory diagram illustrating an example of the reading-in-progress screen 900. In FIG. 9, the reading-in-progress screen 900 is displayed in second or later authentication executed on the terminal Tj. The reading-in-progress screen 900 includes a progress bar 901 indicating the progress of a process of generating the authentication data to be used to execute authentication on the terminal Tj using the key information item of the terminal Tj.

Example of Functional Configuration of Access Control System 200

Next, an example of a functional configuration of the access control system 200 is described with reference to FIG. 10. First, an example of a functional configuration of an access control device APi is described below.

Example of Functional Configuration of Access Control Device APi

Figure 10:
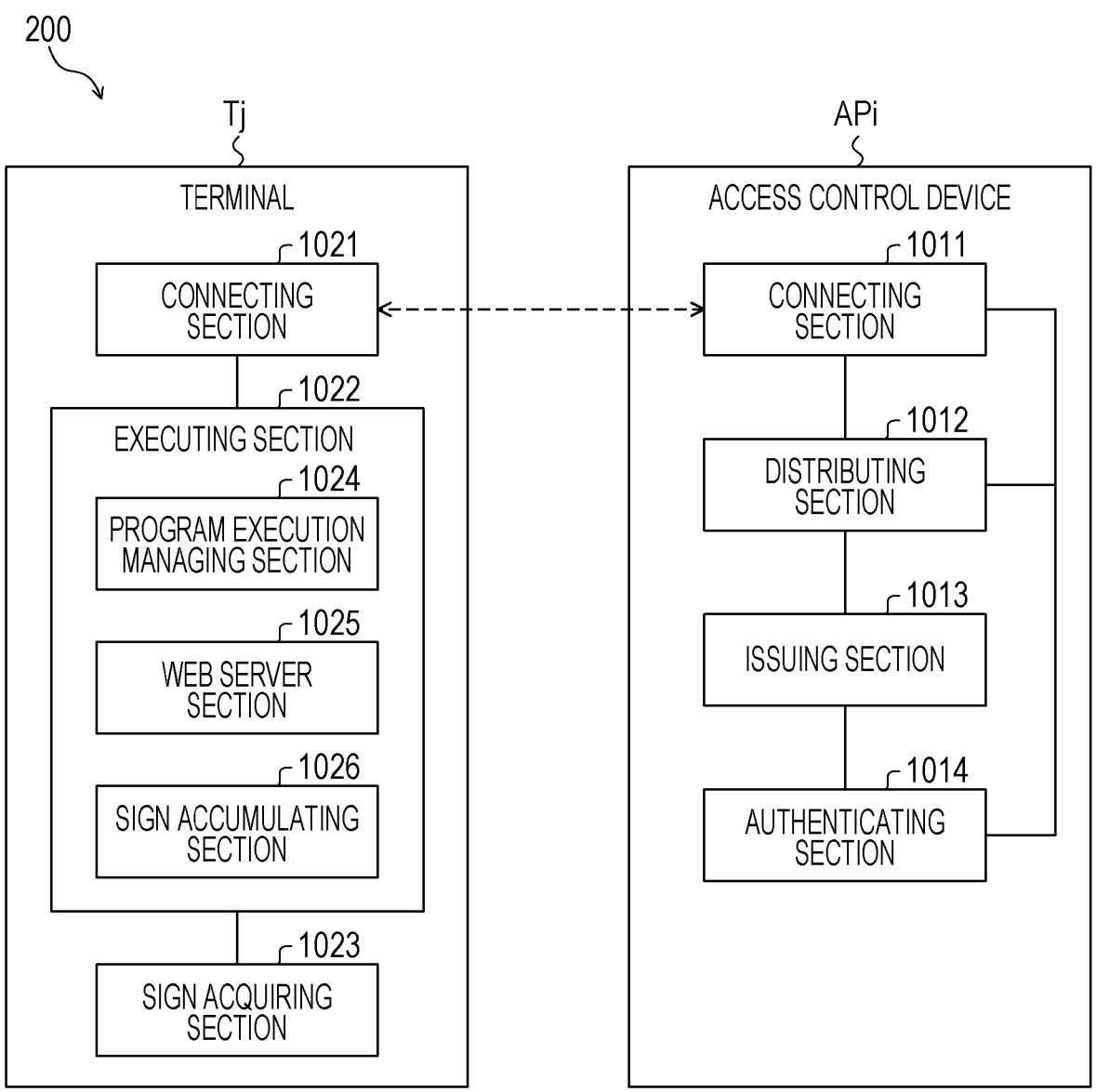
FIG. 10 is a block diagram illustrating an example of a functional configuration of an access control system.

FIG. 10 is a block diagram illustrating the example of the functional configuration of the access control system 200. In FIG. 10, the access control device APi includes a connecting section 1011, a distributing section 1012, an issuing section 1013, and an authenticating section 1014. The connecting section 1011, the distributing section 1012, the issuing section 1013, and the authenticating section 1014 are functions serving as a controller. For example, the functions are enabled by causing the CPU 301 to execute a program stored in a storage device that is the memory 302 illustrated in FIG. 3, the disk 304 illustrated in FIG. 3, or the like or are enabled by the public I/F 305 or the WLAN I/F 306. Results of processes executed by the functions are stored in the storage device that is the memory 302, the disk 304, or the like.

The connecting section 1011 receives a request for a connection to the wireless LAN from a terminal Tj. The request for the connection to the wireless LAN is transmitted by the terminal Tj in order for the terminal Tj to access the network 210 via the access control device APi. The request for the connection includes a MAC address of the terminal Tj, for example.

When the connecting section 1011 receives the request for the connection to the wireless LAN from the terminal Tj, the connecting section 101 starts a transport layer security (TLS) connection to the terminal Tj, for example. In this case, the terminal Tj acquires a public key of the access control device APi and confirms a secret key of the access control device APi.

In this case, the access control device APi transmits, to the terminal Tj, the public key of the access control device APi and encrypted data obtained by encrypting challenge data using the secret key of the access control device APi. The challenge data is random data (random number) generated by the access control device APi. The terminal Tj uses the public key acquired from the access control device APi to decode the encrypted data received from the access control device APi. When the encrypted data has been normally decoded, the terminal Tj determines that the access control device APi is authorized. When the encrypted data has not been normally decoded, the terminal Tj determines that the access control device APi is not authorized. In this manner, the terminal Tj may determine whether the access control device Api is authorized.

The distributing section 1012 determines whether or not the key information item associated with identification information of the terminal Tj is already registered in response to the reception, by the connecting section 1011, of the request for the connection to the wireless LAN from the terminal Tj. The key information item associated with the identification information of the terminal Tj is used to execute authentication on the terminal Tj and is, for example, a public key of the terminal Tj.

For example, the distributing section 1012 references the sign management DB 500 illustrated in FIG. 5 and determines whether or not a firstAuth flag associated with the MAC address of the terminal Tj from which the access control device APi has received the request for the connection to the wireless LAN indicates "true". When the first-Auth flag indicates "true", initial authentication is to be executed on the terminal Tj and the key information item is not registered.

When the firstAuth flag indicates "true", the distributing section 1012 determines that the key information item associated with the identification information of the terminal Tj is not registered. When the firstAuth flag indicates "false", the distributing section 1012 determines that the key information item associated with the identification information of the terminal Tj is already registered.

The key information item of the terminal Tj may be key information items different for dates, periods, or subjects. For example, when key information items different for periods are used, the access control device APi receives specified IDs of the key information items upon the start of classes. In this case, the IDs of the key information items are specified by the manager terminal 201 illustrated in FIG. 2, for example. In this case, the distributing section 1012 references the sign management DB 500 and determines the MAC address of the terminal Tj from which the access control device APi has received the request for the connection to the wireless LAN. In addition, the distributing section 1012 determines whether or not firstAuth flags associated with the IDs of the key information items indicate "true".

The issuing section 1013 issues a sign from a device 307 (refer to FIG. 3) supporting a reading scheme for the terminal Tj in response to the reception, by the connecting section 1011, of the request for the connection to the wireless LAN from the terminal Tj. For example, when the distributing section 1012 determines that the key information item associated with the identification information of the terminal Tj is not registered, the issuing section 1013 issues the sign from the device 307 supporting the reading scheme for the terminal Tj.

For example, the issuing section 1013 references the sign management DB 500 and identifies a reading scheme and a sign that are associated with the MAC address of the terminal Tj. Then, the issuing section 1013 issues the identified sign from the device 307 supporting the identified reading scheme. The sign indicates, for example, a "password" to be used to execute authentication on the terminal Tj.

For example, it is assumed that the reading scheme associated with the MAC address of the terminal Tj is "projector" and the sign is "1234". In this case, the issuing section 1013 causes the projector 308 illustrated in FIG. 3 to display the sign "1234" on a screen such as a chalkboard in a classroom, for example.

In addition, it is assumed that the reading scheme associated with the MAC address of the terminal Tj is "NFC" and the sign is "1234". In this case, the issuing section 1013 causes the reader and writer device 309 illustrated in FIG. 3 to write the sign "1234" to a tag.

In addition, it is assumed that the reading scheme associated with the MAC address of the terminal Tj is "beacon" and the sign is "1234". In this case, the issuing section 1013 causes the beacon transmitter 310 illustrated in FIG. 3 to transmit a beacon signal indicating the sign "1234".

When the ID of the key information item is specified, the issuing section 1013 references the sign management DB 500 and identifies a reading scheme and a sign that are associated with the MAC address of the terminal Tj and the specified ID of the key information item.

When the key information item associated with the identification information of the terminal Tj is not registered, the distributing section 1012 transmits the control program Prg1 to the terminal Tj. The control program Prg1 generates a key information item of the terminal Tj and acquires authentication data corresponding to a sign read by the reading scheme for the terminal Tj. The key information item of the terminal Tj is a pair of public and secret keys to be used to execute authentication on the terminal Tj.

The control program Prg1 generates the key information item (pair of public and secret keys) of the terminal Tj, acquires the authentication data corresponding to the sign, and transmit a response including the generated public key and the acquired authentication data to the access control device APi. To acquire the authentication data corresponding to the sign, the sign entry screen 800 illustrated in FIG. 8 is displayed in the terminal Tj, for example.

For example, the distributing section 1012 references the program DB 600 illustrated in FIG. 6 and identifies the control program Prg1 associated with the reading scheme for the terminal Tj. Then, the distributing section 1012 transmits the identified control program Prg1 to the terminal Tj.

For example, it is assumed that the reading scheme associated with the MAC address of the terminal Tj is "projector". In this case, the distributing section 1012 references the program DB 600 and identifies the control program Prg1 "inputSign.html" associated with the type "firstPrg" and the reading scheme "projector". Then, the distributing section 1012 transmits the identified control program Prg1 "inputSign.html" to the terminal Tj.

The authenticating section 1014 determines whether the terminal Tj is authorized based on the authentication data included in the response upon receiving the response including the key information item and the authentication data from the terminal Tj. For example, the authenticating section 1014 receives the response including the public key of the terminal Tj and the authentication data from the terminal Tj to which the distributing section 1012 has transmitted the control program Prg1.

For example, it is assumed that the sign is a "password" and serves as the authentication data to be used to execute authentication on the terminal Tj. In this case, the authenticating section 1014 determines whether or not the authentication data included in the response matches a sign issued from the device 103. When the authentication data matches the sign, the authenticating section 1014 determines that the terminal Tj is authorized. When the authentication data does not match the sign, the authenticating section 1014 determines that the terminal Tj is not authorized.

When the authenticating section 1014 determines that the terminal Tj is authorized, the authenticating section 1014 associates the key information item included in the response with the identification information of the terminal Tj and registers the associated key information item and the associated identification information. For example, when the authenticating section 1014 determines that the terminal Tj is authorized, the authenticating section 1014 associates the public key, included in the response, of the terminal Tj with the MAC address of the terminal Tj and registers the associated public key and the associated MAC address in the sign management DB 500.

An example of the update of the sign management DB 500 is described with reference to FIG. 11. The sign management information 500-1 registered in the sign management DB 500 is described as an example.

Figure 11:
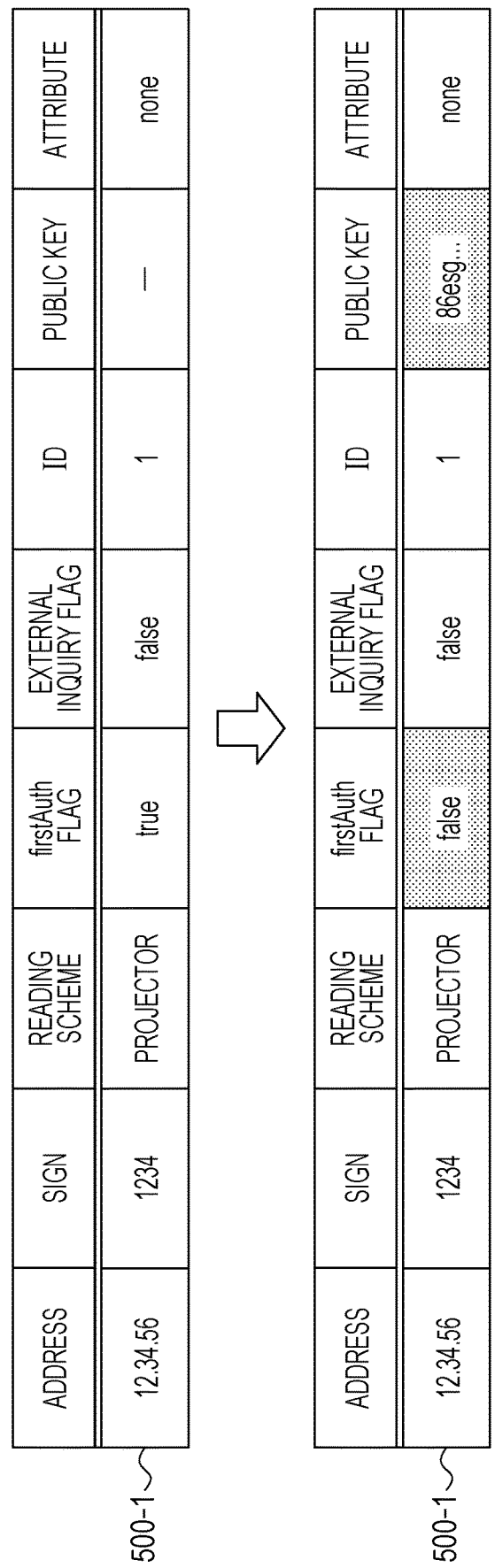
FIG. 11 is an explanatory diagram illustrating an example of the update of the sign management DB.

FIG. 11 is an explanatory diagram illustrating an example of the update of the sign management DB 500. As illustrated in FIG. 11, when a terminal Tj with a MAC address "12.34.56" is authorized, the authenticating section 1014 associates a public key "86esg . . . ", included in a response, of the terminal Tj with the MAC address "12.34.56" of the terminal Tj and sets the public key "86esg . . . " and the MAC address "12.34.56" in the sign management information 500-1. In addition, the authenticating section 1014 sets a firstAuth flag of the sign management information 500-1 to "false".

Return to the description of FIG. 10. When the authenticating section 1014 determines that the terminal Tj is authorized, the connecting section 1011 executes a connection process of establishing a connection to the terminal Tj. The connection process enables the terminal Tj to access the network 210 via the access control device APi. When the connection process is normally completed, the terminal Tj may access the network 210 via the access control device APi.

When the authenticating section 1014 determines that the terminal Tj is not authorized, the connecting section 1011 transmits an error response to the terminal Tj and executes a process of disconnecting a connection to the terminal Tj. The disconnection process is executed to disconnect the connection to the terminal Tj or disconnect, for example, a TLS connection to the terminal Tj.

When the key information item associated with the identification information of the terminal Tj is already registered, the distributing section 1012 transmits the control program Prg2 to the terminal Tj. The control program Prg2 generates authentication data to be used to execute authentication using the key information item of the terminal Tj.

The control program Prg2 includes an ID of the key information item and challenge data. The control program Prg2 reads the secret key, associated with the ID, of the terminal Tj, uses the secret key to encrypt the challenge data and generate the authentication data, and transmit a response including the generated authentication data to the access control device APi. During the execution of the control program Prg2, the reading in program screen 900 illustrated in FIG. 9 is displayed in the terminal Tj, for example.

For example, the distributing section 1012 references the sign management DB 500 and identifies an ID and an attribute that are associated with the MAC address of the terminal Tj. Then, the distributing section 1012 references the program DB 600 and identifies the control program Prg2 associated with the type "authPrg", the identified ID, and the identified attribute. Then, the distributing section 1012 transmits the identified control program Prg2 to the terminal Tj.

For example, it is assumed that the ID associated with the MAC address of the terminal Tj is "1" and the attribute associated with the MAC address of the terminal Tj is "none". In this case, the distributing section 1012 references the program DB 600 and identifies the control program Prg2 "Index.html.none1" associated with the type "authPrg", the ID "1", and the attribute "none". Then, the distributing section 1012 transmits the identified control program Prg2 "Index.html.none1" to the terminal Tj.

The authenticating section 1014 determines whether the terminal Tj is authorized based on the authentication data included in the response upon receiving the response including the authentication data from the terminal Tj. For example, the authenticating section 1014 receives the response including the authentication data of the terminal Tj from the terminal Tj to which the distributing section 1012 has transmitted the control program Prg2.

The authentication data is obtained by using an encryption key of the terminal Tj to encrypt the challenge data included in the control program Prg2, for example. For example, the authenticating section 1014 references the sign management DB 500 and identifies the public key associated with the MAC address of the terminal Tj. When the ID of the key information item is specified, the authenticating section 1014 identifies the public key associated with the MAC address of the terminal Tj and the specified ID.

Then, the authenticating section 1014 uses the identified public key to decode the authentication data included in the response. When the authentication data has been normally decoded, the authenticating section 1014 determines that the terminal Tj is authorized. When the authentication data has not been normally decoded, the authenticating section 1014 determines that the terminal Tj is not authorized.

When the authenticating section 1014 determines that the terminal Tj is authorized, the connecting section 1011 executes the process of establishing a connection to the terminal Tj. When the authenticating section 1014 determines that the terminal Tj is not authorized, the connecting section 1011 transmits an error response to the terminal Tj and executes the process of disconnecting a connection to the terminal Tj. Thus, second or later authentication may be executed on the terminal Tj using the registered key information item (public key) associated with the identification information (MAC address) of the terminal Tj.

Signs issued from the devices 307 may request a facial image. The signs may not indicate a "password", and whether or not the signs request a facial image may be determined based on external inquiry flags.

For example, it is assumed that the reading scheme associated with the MAC address of the terminal Tj is "projector", the sign (password) associated with the MAC address of the terminal Tj is "1234", and an external inquiry flag associated with the MAC address of the terminal Tj indicates "true". In this case, the issuing section 1013 causes the projector 308 to display the sign "1234" on a screen such as a chalkboard in a classroom and display a message promoting the capturing of a facial image on the screen.

In this case, the control program Prg1 further acquires a facial image of the user of the terminal Tj as authentication data corresponding to the sign read by the reading scheme for the terminal Tj. For example, the facial image of the user of the terminal Tj may be displayed on the sign entry screen 800 illustrated in FIG. 8 and captured.

When the authenticating section 1014 receives a response including the key information item and the authentication data (password and facial image) from the terminal Tj, the authenticating section 1014 transmits the authentication data (facial image) included in the response to a specific terminal. In this case, the specific terminal is already registered as a terminal for confirming the authentication data (facial image) and is, for example, the manager terminal 201 illustrated in FIG. 2.

In this case, the authenticating unit 1014 associates the authentication data (facial image) included in the response received from the terminal Tj with the MAC address of the terminal Tj and transmits the authentication data (facial image) and the MAC address of the terminal Tj to the specific terminal. When the authentication data (facial image) included in the response received from the terminal Tj is received by the manager terminal 201, a facial image confirmation screen 1200 illustrated in FIG. 12 is displayed in the manager terminal 201, for example.

Figure 12:
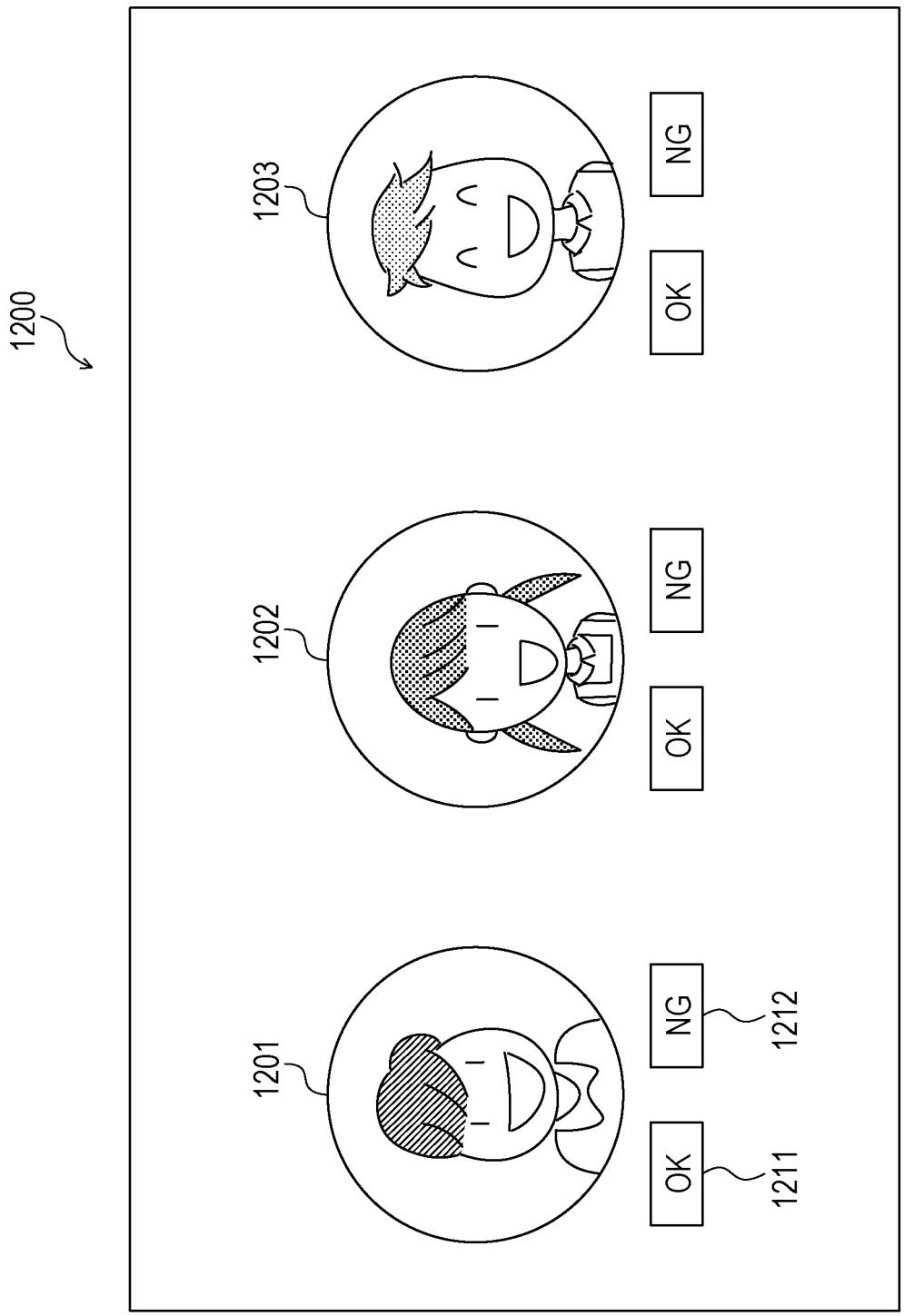
FIG. 12 is an explanatory diagram illustrating an example of a facial image confirmation screen.

FIG. 12 is an explanatory diagram illustrating an example of the facial image confirmation screen 1200. In FIG. 12, the facial image confirmation screen 1200 is an operational screen on which the facial image of the user of the terminal Tj is confirmed. In the example illustrated in FIG. 12, facial images of multiple users are collectively displayed.

Facial images 1201 to 1203 are displayed on the facial image confirmation screen 1200. The facial images 1201 to 1203 are included in responses from different terminals Tj or are captured by the different terminals Tj. A method of confirming a facial image is described using the facial image 1201 as an example.

When a button 1211 on the facial image confirmation screen 1200 is touched by an input operation of a manager (teacher), a response including a confirmation result indicating that the facial image 1201 has been captured from an authorized user is transmitted to the access control device APi. When a button 1212 on the facial image confirmation screen 1200 is touched, a response including a confirmation result indicating that the facial image 1201 has been captured from an unauthorized user is transmitted to the access control device APi. Each of the responses includes a MAC address associated with the facial image 1201.

The facial images 1201 to 1203 may include user information (for example, names) associated with MAC addresses of the aforementioned different terminals Tj and may be displayed.

In this case, the authenticating section 1014 determines whether the terminals Tj are authorized based on authentication data (passwords) included in the responses and details of a response from the specific terminal. For example, when the authenticating section 1014 receives, from the manager terminal 201, a response including a confirmation result indicating that authentication data (password) matches a sign (password) and that the facial image has been captured from an authorized user, the authenticating section 1014 determines that the terminal Tj is authorized.

When the authenticating section 1014 receives, from the manager terminal 201, a response including a confirmation result indicating that the authentication data (password) does not matches the sign (password) or that the facial image has been captured from an unauthorized user, the authenticating section 1014 determines that the terminal Tj is not authorized. Thus, the authenticating section 1014 may determine whether a terminal Tj is authorized using not only a sign (password) but also a facial image of a user of the terminal Tj and may inhibit an unauthorized user from using a terminal Tj in an unauthorized manner.

The signs issued from the devices 307 may only request a facial image. For example, it is assumed that a reading scheme associated with a MAC address of a terminal Tj is "projector" and a sign associated with the MAC address of the terminal Tj is an "image request". In this case, the issuing section 1013 causes the projector 308 to display a message promoting the capturing of a facial image to be displayed on a screen such as a chalkboard in a classroom.

In this case, the control program Prg1 acquires a facial image of a user of the terminal Tj as authentication data associated with the sign read by the reading scheme for the terminal Tj. For example, an operational screen for promoting the capturing of a facial image of the user of the terminal Tj may be displayed in the terminal Tj, instead of the sign entry screen 800 illustrated in FIG. 8.

When the authenticating section 1014 receives a response including a key information item and authentication data (facial image) from the terminal Tj, the authenticating section 1014 transmits the authentication data (facial image) included in the response to the specific terminal. In this case, the authenticating section 1014 associates the authentication data (facial image) included in the response received from the terminal Tj with the MAC address of the terminal Tj and transmits the authentication data (facial image) and the MAC address to the specific terminal.

As described above, the specific terminal is, for example, the manager terminal 201. When the authentication data (facial image) included in the response received from the terminal Tj is received by the manager terminal 201, the facial image confirmation screen 1200 illustrated in FIG. 12 is displayed in the manager terminal 201, for example.

In this case, when the authenticating section 1014 receives a response from the specific terminal, the authenticating section 1014 determines whether the terminal Tj is authorized based on details of the response received from the specific terminal. For example, when the authenticating section 1014 receives, from the manager terminal 201, a response including a confirmation result indicating that the facial image has been captured from an authorized user, the authenticating section 1014 determines that the terminal Tj is authorized. When the authenticating section 1014 receives, from the manager terminal 201, a response including a confirmation result indicating that the facial image has been captured from an unauthorized user, the authenticating section 1014 determines that the terminal Tj is not authorized.

Thus, whether a terminal Tj is authorized may be determined using a facial image of a user of the terminal Tj, instead of a sign (password). For example, a teacher may confirm the facial image of the user of the terminal Tj as attendance confirmation.

In addition, when the authenticating section 1014 receives, from a terminal Tj, a response including a key information item and authentication data that is multiple signs, the authenticating section 1014 may determine whether the terminal Tj is authorized based on the multiple signs. The multiple signs that are the authentication data are signs acquired upon a connection of the terminal Tj to the access control device APi in the past.

For example, the authenticating section 1014 references the sign management DB 500 and identifies all signs associated with the MAC address of the terminal Tj. The identified signs are signs issued upon a past connection of the terminal Tj to the access control device APi. When the multiple signs that are the authentication data match the identified signs, the authenticating section 1014 determines that the terminal Tj is authorized.

When any of the multiple signs that are the authentication data is not included in the identified signs, or any of the identified signs is not included in the multiple signs that are the authentication data, the authenticating section 1014 determines that the terminal Tj is not authorized. Thus, the authenticating section 1014 may determine whether the terminal Tj is authorized using signs issued to the terminal Tj in the past.

When the connecting section 1011 receives the request for the connection to the wireless LAN from the terminal Tj, the connecting section 1011 may reference the sign management DB 500 and determine whether or not the MAC address of the terminal Tj from which the connecting section 1011 has received the request for the connection to the wireless LAN is already registered. When the MAC address is not registered, the connecting section 1011 may transmit an error response to the terminal Tj from which the connecting section 1011 has received the request for the connection to the wireless LAN.

For example, in the case where MAC addresses of all terminals to be used by students are registered in the sign management DB 500 in advance, the connecting section 1011 may transmit an error response to reject a connection upon receiving a request for the connection from a terminal of a person who does not belong to a school. While access control devices APi may be installed for classes, MAC addresses of all terminals to be used by students of the classes may be registered on a class basis. In this case, connecting sections 1011 of the access control devices APi may transmit an error response to reject a connection upon receiving a request for the connection from a terminal of a person who does not belong to a class.

Example of Functional Configuration of Terminal Tj

Next, an example of functional configurations of the terminals Tj is described.

In FIG. 10, the terminal Tj includes a connecting section 1021, an executing section 1022, and a sign acquiring section 1023. The connecting section 1021, the executing section 1022, the sign acquiring section 1023 are functions serving as a controller and are enabled by causing the CPU 401 of the terminal Tj to execute a program stored in a storage device such as the memory 402, illustrated in FIG. 4, of the terminal Tj or are enabled by the WLAN I/F 403 of the terminal Tj. Results of processes executed by the functional sections are stored in, for example, the memory 402.

The connecting section 1021 transmits a request for a connection to the wireless LAN to the access control device APi. For example, when a user (student) performs an entry operation using the input device 405, illustrated in FIG. 4, of the terminal Tj to select an SSID, the connecting section 1021 receives the SSID and transmits a request for a connection to the wireless LAN to an access control device APi of the selected SSID in response to the reception of the selected SSID.

When the executing section 1022 receives the control program Prg1 from the access control device APi to which the terminal Tj has transmitted the request for the connection to the wireless LAN, the executing section 1022 executes the received control program Prg1. The executing section 1022 includes a program execution managing section 1024, a web server section 1025, and a sign accumulating section 1026.

When the program execution managing section 1024 receives the control program Prg1 from the access control device APi, the program execution managing section 1024 activates the web server section 1025 associated with the access control device APi. For example, the program execution managing section 1024 activates the web server section 1025 (http://localhost/xxx) associated with the public key of the access control device APi in a one-to-one manner. In this case, xxx corresponds to the access control device APi.

Then, the program execution managing section 1024 activates a browser set to read the address (http://localhost/xxx) of the web server 1025, acquires a program from the web server 1025 via the browser, and executes the acquired program.

As a result, the sign acquiring section 1023 generates a key information item of the terminal Tj and acquires authentication data corresponding to a sign read by a reading scheme for the terminal Tj in accordance with control by the browser.

For example, it is assumed that a device 307 that issues the sign is the projector 308 and that the projector 308 displays the sign "1234" on a screen such as a chalkboard in a classroom.

In this case, the sign acquiring section 1023 receives the sign displayed by the device 307 and entered by an entry operation of a user (student) with the input device 405 and acquires the entered sign as authentication data. For example, the sign acquiring section 1023 receives and acquires the sign displayed by the projector 308 and entered on the sign entry screen 800 (refer to FIG. 8) displayed by the browser. In addition, the sign acquiring section 1023 generates a key information item (pair of public and secret keys) of the terminal Tj.

It is assumed that the device 307 that issues the sign is the reader and writer device 309 and that the reader and writer device 309 writes the sign "1234" to a tag.

In this case, when the reader and writer device 407 reads the sign "1234" written to the tag of the reader and writer device 309, the sign acquiring section 1023 acquires the read sign "1234" as authentication data. For example, when the user (student) of the terminal Tj holds the terminal Tj over the reader and writer device 309 of the access control device APi, the sign acquiring section 1023 reads the sign "1234" written by the reader and writer device 407 to the tag of the reader and writer device 309. In addition, the sign acquiring section 1023 generates a key information item (pair of public and secret keys) of the terminal Tj.

In addition, it is assumed that the device 307 that issues the sign is the beacon transmitter 310 and that a beacon signal indicating the sign "1234" is transmitted by the beacon transmitter 310.

In this case, when the beacon receiver 408 receives the beacon signal transmitted by the beacon transmitter 310, the sign acquiring section 1023 acquires the sign "1234" indicated by the received beacon signal as authentication data. In addition, the sign acquiring section 1023 generates a key information item (pair of public and secret keys) of the terminal Tj.

A sign issued by a device 307 may request a facial image. In this case, the camera 406 illustrated in FIG. 4 captures a facial image of the user (student) of the terminal Tj, and the sign acquiring section 1023 acquires the captured facial image as authentication data. For example, the camera 406 may capture the facial image of the user (student) of the terminal Tj, and the sign acquiring section 1023 may acquire the captured facial image on a facial image entry screen (not illustrated) displayed by the browser.

The sign accumulating section 1026 accumulates an acquired sign. For example, the sign accumulating section 1026 associates the acquired sign, a generated key information item, and an ID of the key information item with a MAC address of an access control device APi and causes the acquired sign, the generated key information item, the ID of the key information item, the MAC address of the access control device APi to be stored in the key management DB 700 illustrated in FIG. 7. The ID of the key information item is, for example, included in the control program Prg1.

In addition, the sign accumulating section 1026 transmits, to the access control device APi, a response including the generated key information item of the terminal Tj and the acquired authentication data of the terminal Tj. The response transmitted to the access control device APi may include the ID of the key information item.

Multiple signs associated with the MAC address of the access control device APi may exist in the key management DB 700. For example, when key information items different for periods are used, signs associated with key information items used for classes conducted in the past are stored in the key management DB 700. In this case, the sign accumulating section 1026 may cause multiple signs associated with the MAC address of the access control device APi to be included as authentication data in the response to be transmitted to the access control device APi.

When the executing section 1022 receives the control program Prg2 from an access control device APi to which the terminal Tj has transmitted a request for a connection to the wireless LAN, the executing section 1022 executes the received control program Prg2. As a result, the sign accumulating section 1026 generates authentication data to be used to execute authentication on the terminal Tj using the key information item of the terminal Tj.

For example, the sign accumulating section 1026 acquires a secret key associated with the MAC address of the access control device APi from the key management DB 700. When the ID of the key information item is included in the control program Prg2, the sign accumulating section 1026 acquires, from the key management DB 700, the MAC address of the access control device APi and a secret key associated with the ID of the key information item included in the control program Prg2. Then, the sign accumulating section 1026 uses the acquired secret key to encrypt challenge data included in the control program Prg2 and generate authentication data. Then, the sign accumulating section 1026 transmits a response including the generated authentication data to the access control device APi.

When a command to activate the browser is included in the control program Prg2, the program execution managing section 1024 activates the web server section 1025 and the browser, as in the case of the control program Prg1. Then, the reading-in-progress screen 900 illustrated in FIG. 9 may be displayed by the browser during the authentication of the terminal Tj.

When the terminal Tj is authenticated as a result of the transmission of the response to the access control device APi, the connecting section 1021 executes a connection process of establishing a connection to the access control device APi. When the terminal Tj is not authenticated and the connecting section 1021 receives an error response, the connecting section 1021 executes a process of disconnecting a connection to the access control device APi.

The manager terminal 201 may include the same functional sections as those of the aforementioned terminal Tj.

Procedure for Access Control Process of Access Control Device APi

Next, a procedure for an access control process of the access control device APi is described with reference to FIGS. 13 and 14.

Figure 13:
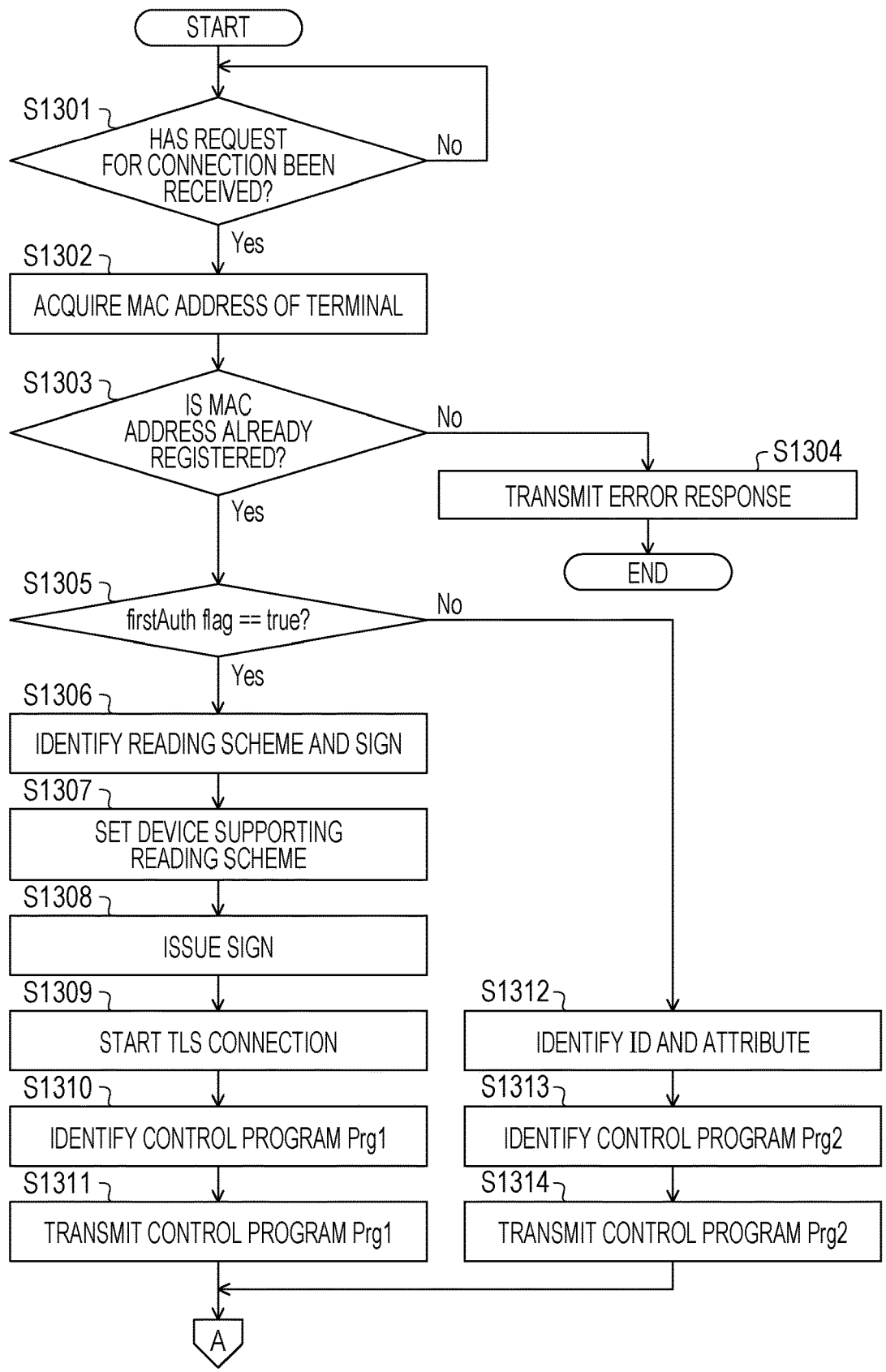
FIG. 13 is a first flowchart illustrating an example of an access control process procedure of an access control device.
Figure 14:
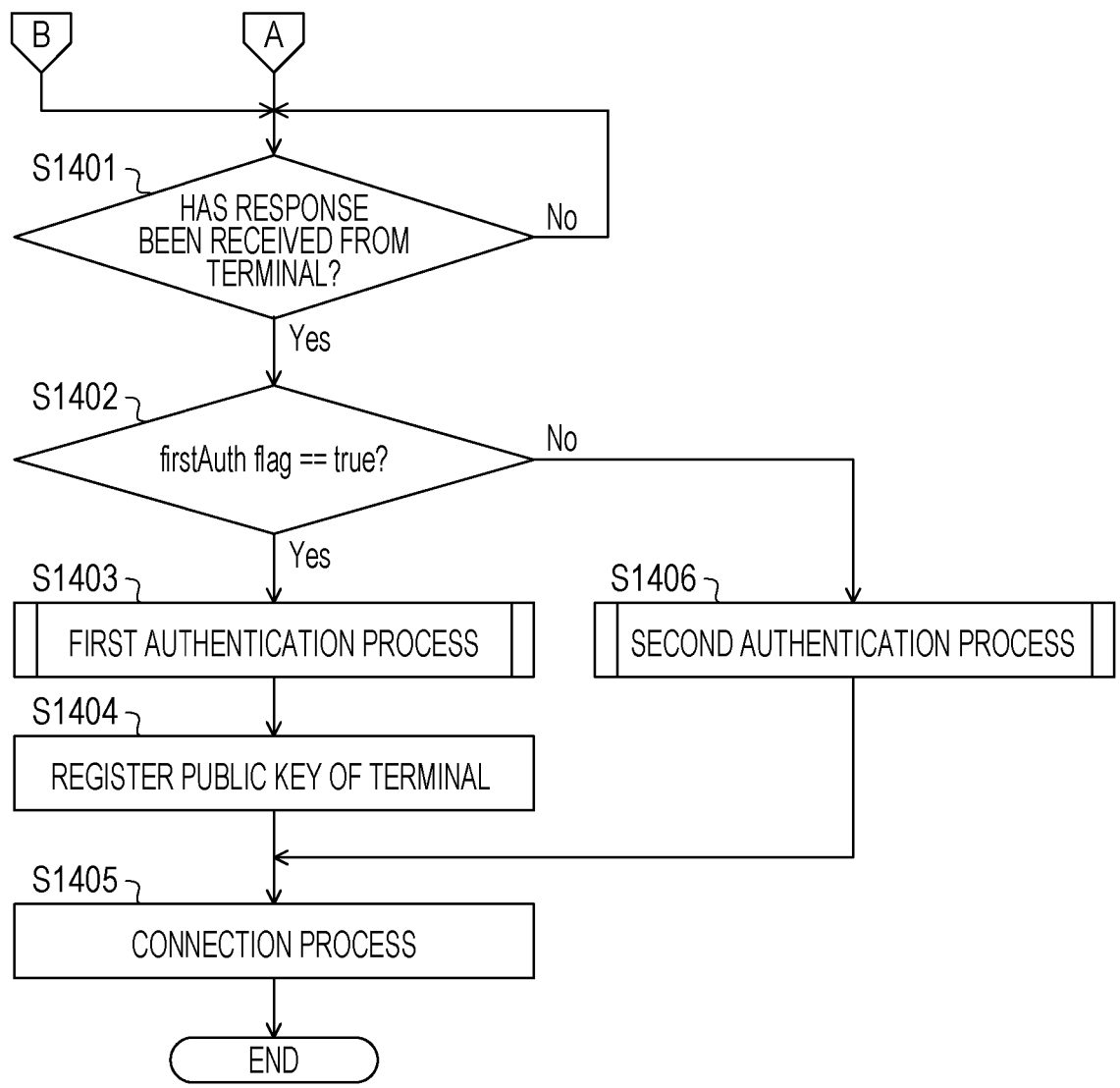
FIG. 14 is a second flowchart illustrating the example of the access control process procedure of the access control device.

FIGS. 13 and 14 are flowcharts illustrating an example of the access control process procedure of the access control device APi. In the flowchart illustrated in FIG. 13, the access control device APi determines whether or not the access control device APi has received a request for a connection to the wireless LAN from a terminal Tj (in step S1301).

The access control device APi waits to receive the request for the connection to the wireless LAN (No in step S1301). When the access control device APi receives the request for the connection to the wireless LAN from the terminal Tj (Yes in step S1301), the access control device APi acquires a MAC address of the terminal Tj (in step S1302).

The access control device APi references the sign management DB 500 and determines whether or not the acquired MAC address is already registered (in step S1303). When the MAC address is not registered (No in step S1303), the access control device APi transmits an error response to the terminal Tj (in step S1304) and terminates the access control process illustrated in FIGS. 13 and 14.

When the MAC address is already registered (Yes in step S1303), the access control device APi references the sign management DB 500 and determines whether or not a firstAuth flag associated with the MAC address of the terminal Tj from which the access control device APi has received the request for the connection to the wireless LAN indicates "true" (in step S1305).

When the firstAuth flag indicates "true" (Yes in step S1305), the access control device APi references the sign management DB 500 and identifies a reading scheme and a sign that are associated with the MAC address of the terminal Tj (in step S1306). Then, the access control device APi sets a device 307 supporting the identified reading scheme (in step S1307).

The access control device APi issues the identified sign from the set device 307 (in step S1308). Then, the access control device APi starts a TLS connection to the terminal Tj (in step S1309).

Then, the access control device APi references the program DB 600 and identifies the control program Prg1 associated with the type "firstPrg" and the identified reading scheme (in step S1310). Then, the access control device APi transmits the identified control program Prg1 to the terminal Tj (in step S1311) and causes the access control process to proceed to step S1401 illustrated in FIG. 14.

When the firstAuth flag indicates "false" (No in step S1305), the access control device APi references the sign management DB 500 and identifies an ID and an attribute that are associated with the MAC address of the terminal Tj (in step S1312).

Then, the access control device APi references the program DB 600 and identifies the control program Prg2 associated with the type "authPrg", the identified ID, and the identified attribute (in step S1313). The access control device APi transmits the identified control program Prg2 to the terminal Tj (in step S1314) and causes the access control process to proceed to step S1401 illustrated in FIG. 14.

In the flowchart illustrated in FIG. 14, the access control device APi determines whether or not the access control device APi has received a response from the terminal Tj (in step S1401). The access control device APi waits to receive the response from the terminal Tj (No in step S1401).

When the access control device APi has received the response from the terminal Tj (Yes in step S1401), the access control device APi references the sign management DB 500 and determines whether or not the firstAuth flag associated with the MAC address of the terminal Tj indicates "true" (in step S1402).

When the firstAuth flag indicates "true" (Yes in step S1402), the access control device APi executes a first authentication process (in step S1403). A specific procedure for the first authentication process is described later with reference to FIG. 15.

Then, when the terminal Tj is authorized, the access control device APi associates a public key, included in the received response, of the terminal Tj with the MAC address of the terminal Tj and registers the associated public key and the associated MAC address in the sign management DB 500 (in step S1404). Then, the access control device APi executes a connection process of establishing a connection to the terminal Tj (in step S1405) and terminates the access control process illustrated in FIGS. 13 and 14. In this case, the access control device APi transmits, to the terminal Tj, a result signal indicating that the authentication has been successful.

When the firstAuth flag indicates "false" (No in step S1402), the access control device APi executes a second authentication process (in step S1406). When the terminal Tj is authorized, the access control device APi causes the access control process to proceed to step S1405. A specific procedure for the second authentication process is described later with reference to FIG. 16.

This may inhibit unauthorized access without an operation of setting certificates or the like in the terminals Tj in advance.

The specific procedure for the first authentication process of step S1403 is described with reference to FIG. 15.

Figure 15:
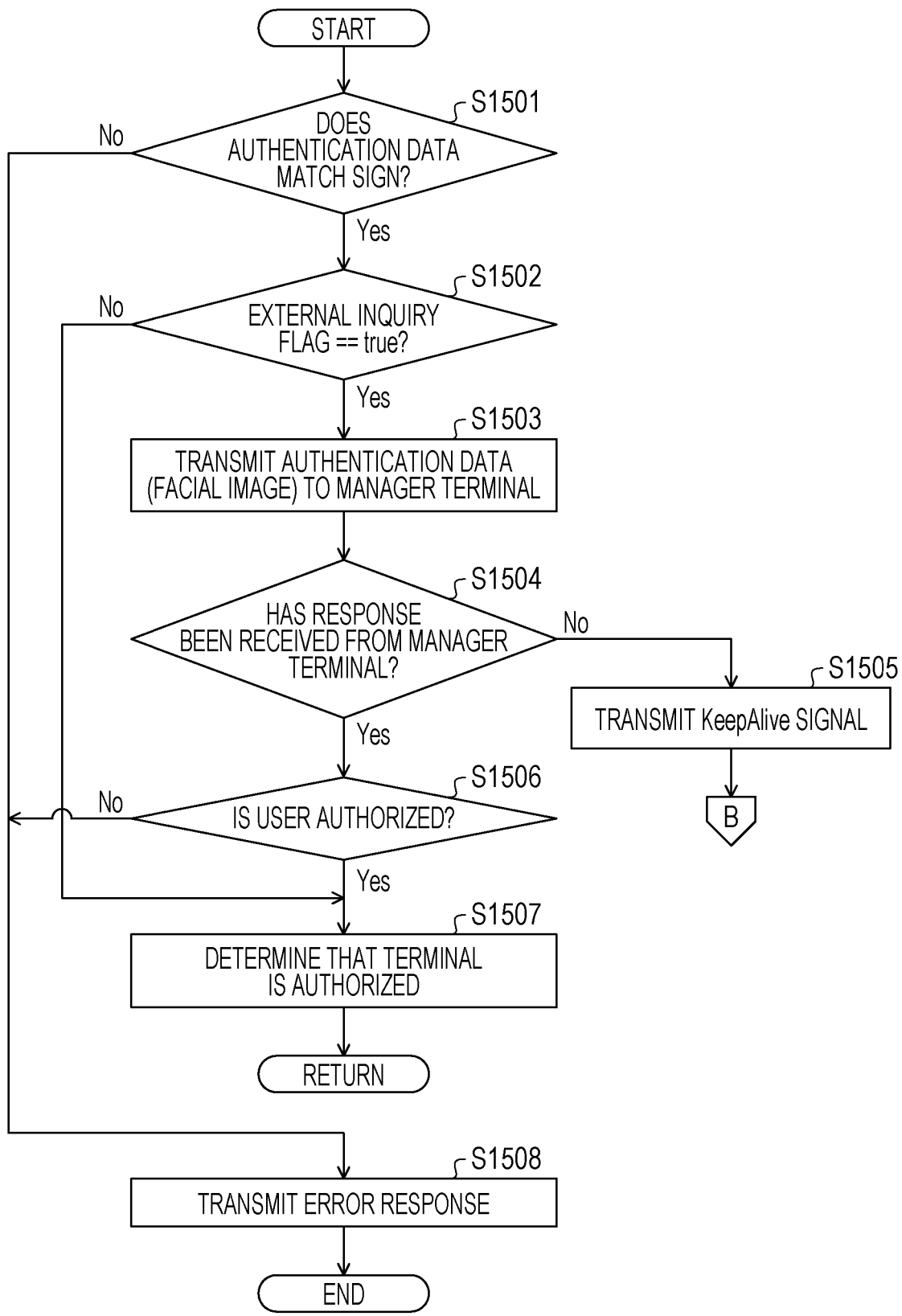
FIG. 15 is a flowchart illustrating an example of a specific procedure for a first authentication process.

FIG. 15 is a flowchart illustrating an example of the specific procedure for the first authentication process. In the flowchart illustrated in FIG. 15, the access control device APi determines whether or not authentication data (password) included in the response received from the terminal Tj matches a sign issued from the device 103 (in step S1501).

When the authentication data does not match the sign (No in step S1501), the access control device APi causes the first authentication process to proceed to step S1508. When the authentication data (password) matches the sign (Yes in step S1501), the access control device APi references the sign management DB 500 and determines whether or not an external inquiry flag associated with the MAC address of the terminal Tj indicates "true" (in step S1502).

When the external inquiry flag indicates "false" (No in step S1502), the access control device APi causes the first authentication process to proceed to step S1507. When the external inquiry flag indicates "true" (Yes in step S1502), the access control device APi transmits the authentication data (facial image) included in the response to the manager terminal 201 (in step S1503).

Then, the access control device APi determines whether or not the access control device APi has received a response from the manager terminal 201 (in step S1504). When the access control device APi has not received the response from the manager terminal 201 (No in step S1504), the access control device APi transmits a KeepAlive signal to the terminal Tj (in step S1505) and causes the access control process to proceed to step S1401 illustrated in FIG. 14. The KeepAlive signal includes a waiting time period.

When the access control device APi has received the response from the manager terminal 201 (Yes in step S1504), the access control device APi determines whether or not the response includes a confirmation result indicating that the facial image has been captured from an authorized user (in step S1506).

When the response includes the confirmation result indicating that the facial image has been captured from the authorized user (Yes in step S1506), the access control device APi determines that the terminal Tj is authorized (in step S1507), and the access control device APi causes the access control process to proceed to step S1404.

On the other hand, when the response includes a confirmation result indicating that the facial image has been captured from an unauthorized user (No in step S1506), the access control device APi transmits an error response to the terminal Tj (in step S1508) and terminates the access control process illustrated in FIGS. 13 and 14. The error signal is a result signal indicating that the authentication has failed.

Thus, the initial authentication is executed on the terminal Tj using the sign (password) issued from the device 307 or using the sign (password) and the facial image.

Next, the specific procedure for the second authentication process of step S1406 is described with reference to FIG. 16.

Figure 16:
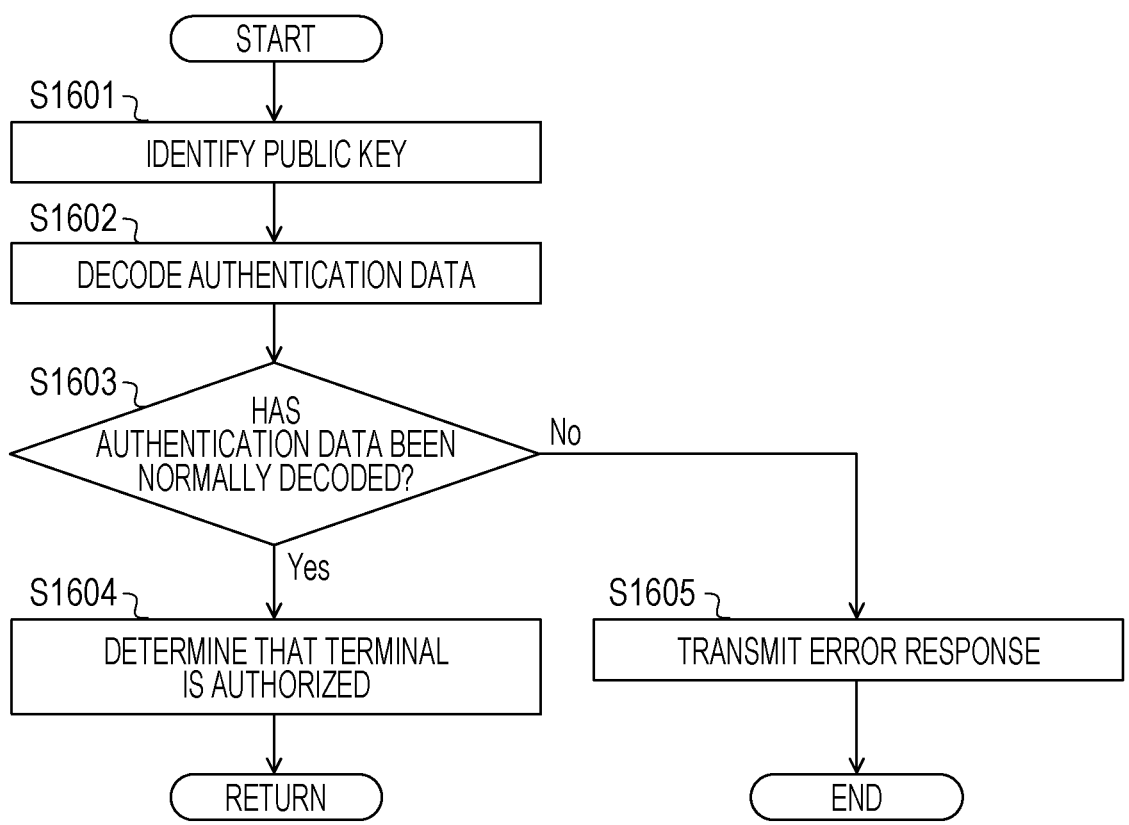
FIG. 16 is a flowchart illustrating an example of a specific procedure for a second authentication process.

FIG. 16 is a flowchart illustrating an example of the specific procedure for the second authentication process. In the flowchart illustrated in FIG. 16, the access control device APi references the sign management DB 500 and identifies a public key associated with the MAC address of the terminal Tj (in step S1601).

Then, the access control device APi uses the identified public key to decode the authentication data included in the response from the terminal Tj (in step S1602). Then, the access control device APi determines whether or not the authentication data has been normally decoded (in step S1603).

When the authentication data has been normally decoded (Yes in step S1603), the access control device APi determines that the terminal Tj is authorized (in step S1604), and the access control device APi causes the access control process to return to step S1405.

When the authentication data has not been normally decoded (No in step S1603), the access control device APi transmits an error response to the terminal Tj (in step S1605) and terminates the access control process illustrated in FIGS. 13 and 14.

Thus, second and later authentication may be executed on the terminal Tj using the key information item (public key), registered upon the initial authentication, of the terminal Tj.

Access Process Procedure of Terminal Tj

Next, an access process procedure of a terminal Tj is described with reference to FIGS. 17 and 18.

Figure 17:
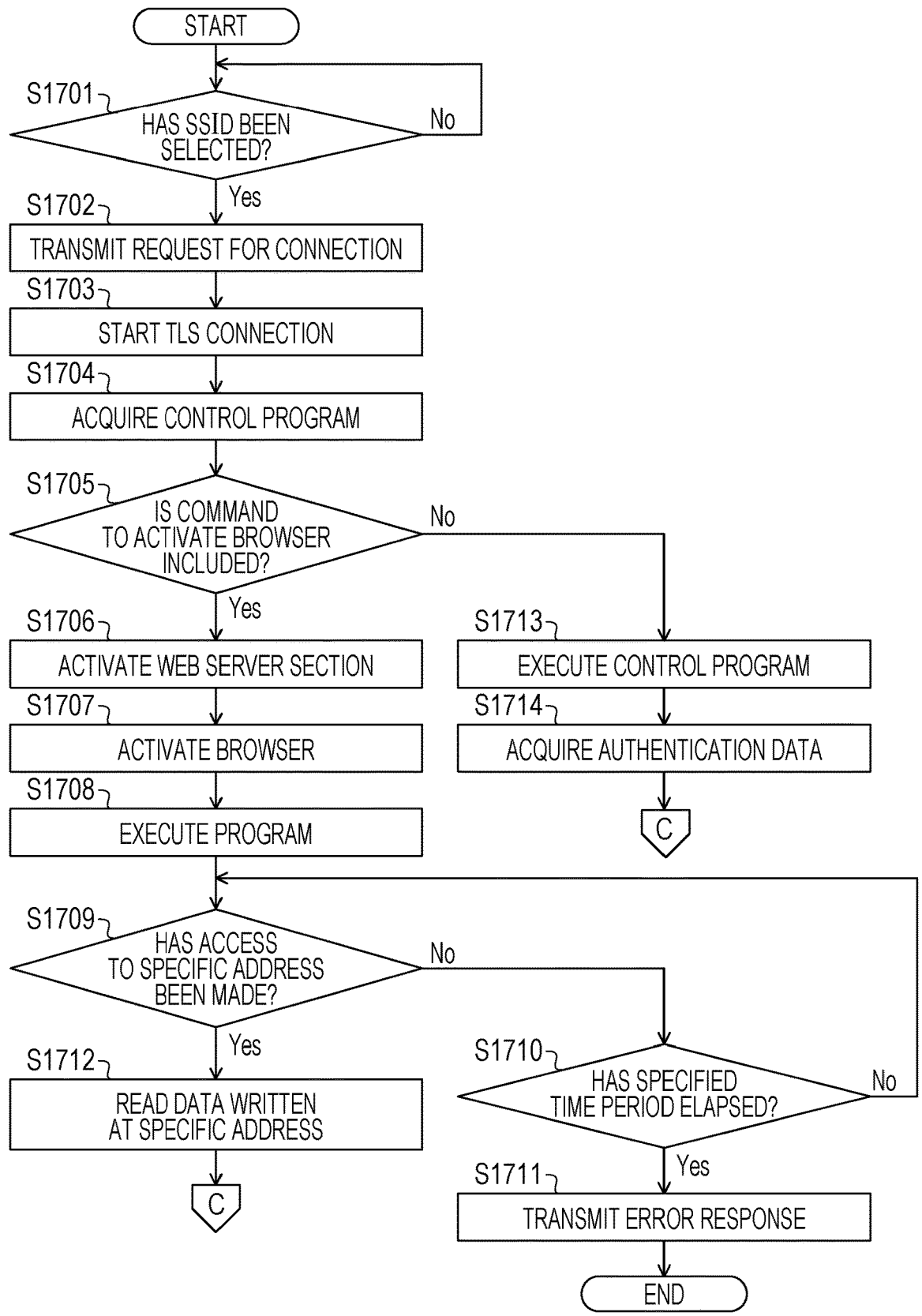
FIG. 17 is a first flowchart illustrating an example of an access process procedure of a terminal.
Figure 18:
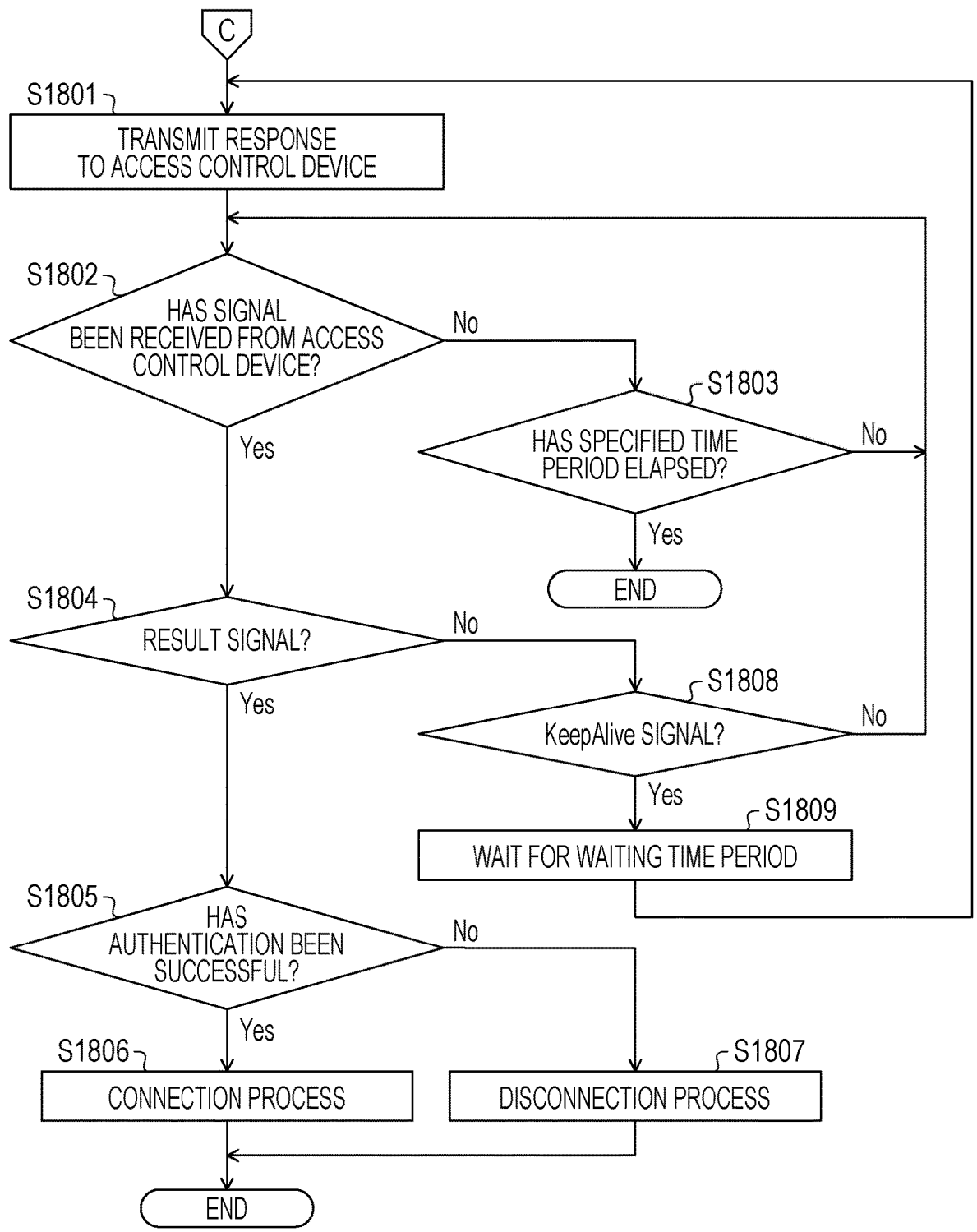
FIG. 18 is a second flowchart illustrating the example of the access process procedure of the terminal.

FIGS. 17 and 18 are flowcharts illustrating an example of the access process procedure of the terminal Tj. In the flowchart of FIG. 17, the terminal Tj determines whether or not an SSID has been selected (in step S1701). The terminal Tj waits for the selection of the SSID (No in step S1701).

When the SSID has been selected (Yes in step S1701), the terminal Tj transmits a request for a connection to the wireless LAN to an access control device APi of the selected SSID (in step S1702). Then, the terminal Tj starts a TLS connection to the access control device APi of the selected SSID (in step S1703).

When the terminal Tj acquires a control program (control program Prg1 or control program Prg2) from the access control device APi (in step S1704), the terminal Tj determines whether or not the acquired control program includes a command to activate the browser (in step s1705).

When the acquired control program includes the command to activate the browser (Yes in step s1705), the terminal Tj activates the web server section 1025 (https://localhost/xxx) associated with a public key of the access control device APi in a one-to-one manner (in step S1706).

The terminal Tj activates the browser set to read the address (https://localhost/xxx) of the web server 1025 (in step S1707). Then, the terminal Tj acquires the program from the web server section 1025 via the browser and executes the acquired program (in step S1708).

When the acquired control program is the control program Prg1, the control program Prg1 generates a key information item of the terminal Tj and acquires authentication data corresponding to a sign read by a reading scheme for the terminal Tj. When the acquired control program is the control program Prg2, the control program Prg2 generates authentication data to be used to execute authentication using the key information item of the terminal Tj. The generated key information item (public key) and the authentication data are written at a specific address.

Then, the terminal Tj determines whether or not access to the specific address has been made (in step S1709). When the access to the specific address has not been made (No in step S1709), the terminal Tj determines whether or not a specified time period has elapsed after the execution of the program (in step S1710). The specified time period may be arbitrarily set.

When the specified time period has not elapsed (No in step S1710), the terminal Tj causes the access process to return to step S1709. When the specified time period has elapsed (Yes in step S1710), the terminal Tj transmits an error response to the access control device APi (in step S1711) and terminates the access process illustrated in FIGS. 17 and 18.

When the access to the specific address has been made (Yes in step S1709), the terminal Tj reads data written at the specific address (in step S1712) and causes the access process to proceed to step S1801 illustrated in FIG. 18.

When the acquired control program does not include the command to activate the browser (No in step S1705), the terminal Tj executes the acquired control program (control program Prg2) (in step S1713). As a result, authentication data to be used to execute authentication using the key information item of the terminal Tj is generated.

Then, the terminal Tj acquires the generated authentication data (in step S1714) and causes the access process to step S1801 illustrated in FIG. 18.

In the flowchart illustrated in FIG. 18, the terminal Tj transmits a response to the access control device APi (in step S1801). The response transmitted to the access control device APi includes the data read in step S1712 or the authentication data acquired in step S1714.

Then, the terminal Tj determines whether or not the terminal Tj has received a signal from the access control device APi (in step S1802). When the terminal Tj has not received the signal from the access control device APi (No in step S1802), the terminal Tj determines whether or not a specified time period has elapsed after the transmission of the response to the access control device APi (in step S1803).

When the specified time period has not elapsed (No in step S1803), the terminal Tj causes the access process to return to step S1802. When the specified time period has elapsed (Yes in step S1803), the terminal Tj terminates the access process illustrated in FIGS. 17 and 18.

When the terminal Tj has received the signal from the access control device APi (Yes in step S1802), the terminal Tj determines whether or not the received signal is a result signal (in step S1804). When the received signal is the result signal (Yes in step S1804), the terminal Tj determines whether or not the result signal indicates that the authentication has been successful (in step S1805).

When the result signal indicates that the authentication has been successful (Yes in step S1805), the terminal Tj executes a connection process of establishing a connection to the access control device APi (in step S1806) and terminates the access process illustrated in FIGS. 17 and 18. When the result signal indicates that the authentication has failed (No in step S1805), the terminal Tj executes a process of disconnecting a connection to the access control device APi (in step S1807) and terminates the access process illustrated in FIGS. 17 and 18.

When the received signal is not the result signal (No in step S1804), the terminal Tj determines whether or not the received signal is a KeepAlive signal (in step S1808). When the received signal is not the KeepAlive signal (No in step S1808), the terminal Tj causes the access process to return to step S1802.

When the received signal is the KeepAlive signal (Yes in step S1808), the terminal Tj waits for a waiting time period indicated by the KeepAlive signal (in step S1809) and causes the access process to return to step S1801.

Thus, the authentication may be executed on the terminal Tj by executing a program (control program Prg1 or Prg2) distributed from the access control device APi.

As described above, an access control device APi according to the first embodiment may issue a sign from a device 307 supporting a reading scheme for a terminal Tj and transmit the control program Prg1 to the terminal Tj in response to the reception of a request for a connection in wireless communication from the terminal Tj. The control program Prg1 generates a key information item (pair of public and secret keys) of the terminal Tj and acquires authentication data corresponding to the sign read by the reading scheme for the terminal Tj. In addition, when the access control device APi receives a response including the key information item (public key) and the authentication data from the terminal Tj, the access control device APi determines whether the terminal Tj is authorized based on the authentication data included in the response. When the access control device APi determines that the terminal Tj is authorized, the access control device APi associates the key information item (public key) included in the response with identification information (MAC address) of the terminal Tj, registers the associated key information item (public key) and the associated identification information (MAC address), and executes a connection process of establishing a connection to the terminal Tj.

Thus, a load caused by an operation of setting in the terminals Tj to inhibit unauthorized access may be reduced. For example, the access control device APi distributes the control program Prg1 to terminals Tj that have transmitted requests for connections to the access control device APi and causes the terminals Tj to automatically generate key information items and authentication data. Thus, for example, an operation of setting certificates or the like in the terminals Tj may not be performed and the burden on school staff may be reduced. In addition, in the authentication of the terminals Tj, it is sufficient if users (students) of the terminals Tj perform simple operations of selecting SSIDs of connection destinations, entering signs (passwords), and the like, the access control system 200 may be appropriately operated in a school environment such as an elementary or junior high school.

In addition, an access control device APi according to the first embodiment may determine whether or not a key information item associated with identification information of a terminal Tj is already registered in response to the reception of a request for a connection from the terminal Tj. When the key information item associated with the identification information of the terminal Tj is already registered, the access control device APi may transmit the control program Prg2 to the terminal Tj. The control program Prg2 generates authentication data to be used to execute authentication using the key information item of the terminal Tj. In addition, when the access control device APi receives a response including the authentication data from the terminal Tj, the access control device APi may determine whether the terminal Tj is authorized based on the authentication data included in the response. When the access control device APi determines that the terminal Tj is authorized, the access control device APi may execute a connection process of establishing a connection to the terminal Tj.

Thus, second and later authentication may be executed on the terminal Tj using the registered key information item (public key) associated with the identification information (MAC address) of the terminal Tj without the issuance of a sign from a device 307 and the acquisition of a sign by the terminal Tj. Thus, in the second and later authentication of the terminal Tj, efforts of users (students) to enter signs (passwords) may be reduced.

In addition, the access control device APi according to the first embodiment may receive a sign displayed by the projector 308 of the access control device APi and entered by an entry operation performed with an input device 405 of a terminal Tj and use a scheme of reading the entered sign as a reading scheme for the terminal Tj. Thus, for example, users who are permitted to access the network 210 via the access control device APi may be limited by issuing a sign (password) to only students staying in a classroom so as to enable the students to see the sign (password).

In addition, the access control device APi according to the first embodiment may receive a beacon signal issued by the beacon transmitter 310 of the access control device APi and use a scheme of reading a sign indicated by the beacon signal as a reading scheme for a terminal Tj. Thus, for example, users who are permitted to access the network 210 via the access control device APi may be limited by issuing a BLE beacon signal that reaches only terminals Tj of students staying in a classroom. In addition, since an operation of entering a sign is not performed by each of users (students) of terminals Tj, the access control system 200 may be introduced in an environment in which students in early elementary grades use terminals Tj.

In addition, the access control device APi according to the first embodiment may use a scheme of reading a sign written to the reader and writer device 309 of the access control device APi as a reading scheme for a terminal Tj. Thus, for example, users who are permitted to access the network 210 via the access control device APi may be limited by installing the access control device APi (reader and writer device 309) at a position where terminals Tj are held over the access control device APi by only students staying in a classroom.

Second Embodiment

Next, an access control system 1900 according to a second embodiment is described. Sections that are the same as those described in the first embodiment are indicated by the same reference symbols as described in the first embodiment, and a description and illustration thereof are omitted in some cases.

Figure 19:
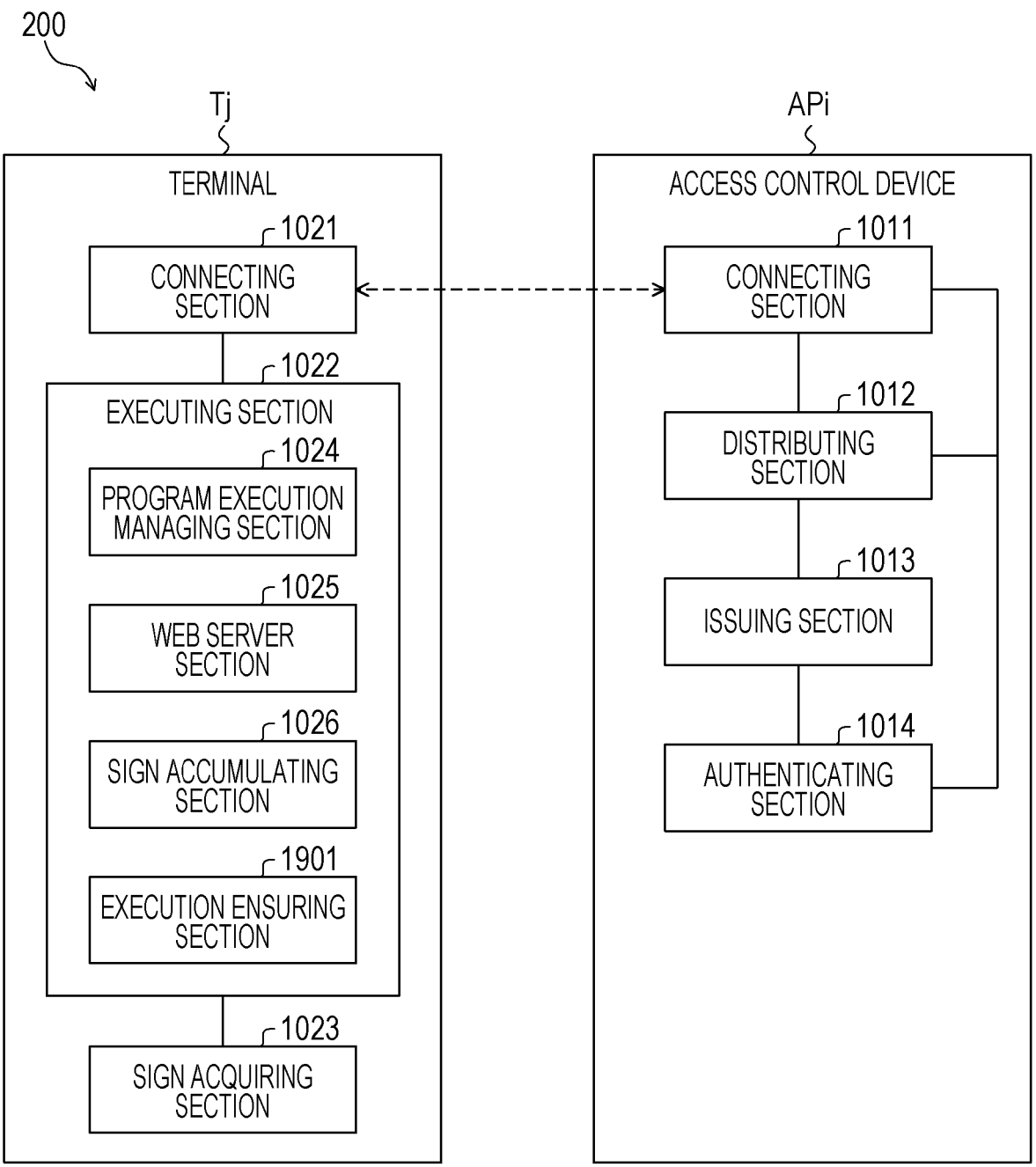
FIG. 19 is a block diagram illustrating an example of a functional configuration of an access control system.

FIG. 19 is a block diagram illustrating an example of a functional configuration of the access control system 1900. In FIG. 19, an access control device APi includes a connecting section 1011, a distributing section 1012, an issuing section 1013, an authenticating section 1014, and a terminal Tj includes a connecting section 1021, an executing section 1022, and a sign acquiring section 1023. Functional sections that are different from those described in the first embodiment are described below.

As described in the first embodiment, the control program Prg1 generates a key information item of a terminal Tj and acquires authentication data corresponding to a sign read by a reading scheme for the terminal Tj. In the second embodiment, the control program Prg1 further acquires information of at least one of the size of the control program Prg1, execution time of the control program Prg1, and a hash value of the control program Prg1.

For example, the executing section 1022 of the terminal Tj includes a program execution managing section 1024, a web server section 1025, a sign accumulating section 1026, and an execution ensuring section 1901. The execution ensuring section 1901 acquires information of at least one of the size of the control program Prg1 executed by the executing section 1022, execution time of the control program Prg1 executed by the executing section 1022, and a hash value of the control program Prg1 executed by the executing section 1022.

The size of the control program Prg1 is an information amount (data size) of the control program Prg1. The execution time of the control program Prg1 is the time when the execution of the control program Prg1 is started. The hash value of the control program Prg1 is a value obtained using a hash function.

The information of at least one of the size, execution time, and hash value of the control program Prg1 executed by the executing section 1022 is hereinafter referred to as "execution information" in some cases.

As a result of the execution of the control program Prg1, the sign accumulating section 1026 of the terminal Tj transmits, to the access control device APi, a response including the generated key information item of the terminal Tj, the acquired authentication data of the terminal Tj, and the acquired execution information. The execution information ensures that the control program Prg1 distributed from the access control device APi has been executed in the terminal Tj.

In this case, the authenticating section 1014 of the access control device APi receives the response including the key information item, the authentication data, and the execution information from the terminal Tj. Then, the authenticating section 1014 determines whether the terminal Tj is authorized based on the authentication data included in the response and the execution information included in the response.

For example, it is assumed that the execution information is the size of the control program Prg1 executed by the terminal Tj. In this case, the authenticating section 1014 compares the size, included in the response from the terminal Tj, of the control program Prg1 with the size of the control program Prg1 transmitted to the terminal Tj. When the size, included in the response from the terminal Tj, of the control program Prg1 does not match the size of the control program Prg1 transmitted to the terminal Tj, the authenticating section 1014 determines that the terminal Tj is not authorized. For example, when the authentication data included in the response matches the sign, and the size, included in the response from the terminal Tj, of the control program Prg1 matches the size of the control program Prg1 transmitted to the terminal Tj, the authenticating section 1014 determines that the terminal Tj is authorized.

In addition, it is assumed that the execution information is the execution time of the control program Prg1 executed by the terminal Tj. In this case, the authenticating section 1014 calculates time difference between the execution time, included in the response from the terminal Tj, of the control program Prg1 and the time when the control program Prg1 is transmitted to the terminal Tj. The time when the control program Prg1 is transmitted to the terminal Tj is stored in the memory 302, the disk 304, or the like, for example.

When the calculated time difference is equal to or longer than a predetermined time period, the authenticating section 1014 determines that the terminal Tj is not authorized. The predetermined time period may be arbitrary set. For example, the predetermined time period may be set to time of several seconds. When the authentication data included in the response matches the sign, and the calculated time difference is shorter than the predetermined time period, the authenticating section 1014 determines that the terminal Tj is authorized.

In addition, it is assumed that the execution information is the hash value of the control program Prg1 executed by the terminal Tj. In this case, the authenticating section 1014 compares the hash value, included in the response from the terminal Tj, of the control program Prg1 with a hash value of the control program Prg1 transmitted to the terminal Tj. When the hash value, included in the response from the terminal Tj, of the control program Prg1 does not match the hash value of the control program Prg1 transmitted to the terminal Tj, the authenticating section 1014 determines that the terminal Tj is not authorized. When the authentication data included in the response matches the sign, and the hash value, included in the response from the terminal Tj, of the control program Prg1 matches the hash value of the control program Prg1 transmitted to the terminal Tj, the authenticating section 1014 determines that the terminal Tj is authorized.

The execution ensuring section 1901 of the terminal Tj may acquire execution information (size, execution time, and hash value) of the control program Prg2. In this case, as a result of the execution of the control program Prg2, the sign accumulating section 1026 of the terminal Tj may transmit a response including generated authentication data of the terminal Tj and the acquired execution information to the access control device APi. Then, the authenticating section 1014 of the access control device APi may determine whether the terminal Tj is authorized based on the authentication data included in the response and the execution information included in the response.

As described above, when the access control device APi according to the second embodiment receives a response including a key information item, authentication data, and execution information of a terminal Tj from the terminal Tj, the access control device APi may determine whether the terminal Tj is authorized based on the authentication data included in the response and the execution information included in the response. The execution information includes at least one of the size of the control program Prg1, execution time of the control program Prg1, and a hash value of the control program Prg1.

Thus, it may be possible to inhibit a denial-of-service (DoS) attack to the access control device APi. For example, when the size, included in the response from the terminal Tj, of the control program Prg1 does not match the size of the control program Prg1 transmitted to the terminal Tj, the access control device APi may determine that the terminal Tj is not authorized. Thus, the access control device APi may detect an attacker terminal that has made access using a program different from the control program Prg1 distributed to the terminal Tj.

For example, when time difference between the execution time, included in the response from the terminal Tj, of the control program Prg1 and the time when the control program Prg1 is distributed to the terminal Tj is equal to or longer than the predetermined time period, the access control device APi may determine that the terminal Tj is not authorized. When a time lag from the distribution of the control program Prg1 to the execution of the control program Prg1 is equal to or longer than the predetermined time period, the access control device APi may detect that access has been made by an attacker terminal.

For example, when the hash value, included in the response from the terminal Tj, of the control program Prg1 does not match the hash value of the control program Prg1 distributed to the terminal Tj, the access control device APi may determine that the terminal Tj is not authorized. Thus, the access control device APi may detect an attacker terminal that has made access using a program different from the control program Prg1 distributed to the terminal Tj.

Third Embodiment

Next, an access control system 2000 according to a third embodiment is described. Sections that are the same as those described in the first and second embodiments are indicated by the same reference symbols as described in the first and second embodiments, and a description and illustration thereof are omitted in some cases.

The third embodiment assumes that a reading scheme associated with a MAC address of a terminal Tj is "NFC". In addition, the third embodiment assumes that a sign issued from a device 307 corresponding to the reading scheme for the terminal Tj or a sign issued from a reader and writer device 309 indicates a "password" to be used to execute authentication on the terminal Tj.

When an NFC reader and writer device for issuing a sign (password) and an NFC reader and writer device for acquiring a sign (password) are used, a man-in-the-middle attack may be received due to an attacking NFC device installed between the NFC reader and writer device for issuing a sign and the NFC reader and writer device for acquiring a sign. For example, the attacking NFC device may be installed so that the attacking NFC device and the NFC reader and writer device for issuing a sign overlap each other and are covered with, and hidden by, a sheet.

The third embodiment describes the case where a man-in-the-middle attack is detected using the time when a user (student) holds a terminal Tj over a reader and writer device 309 of an access control device APi and the time when an NFC session is established.

Figure 20:
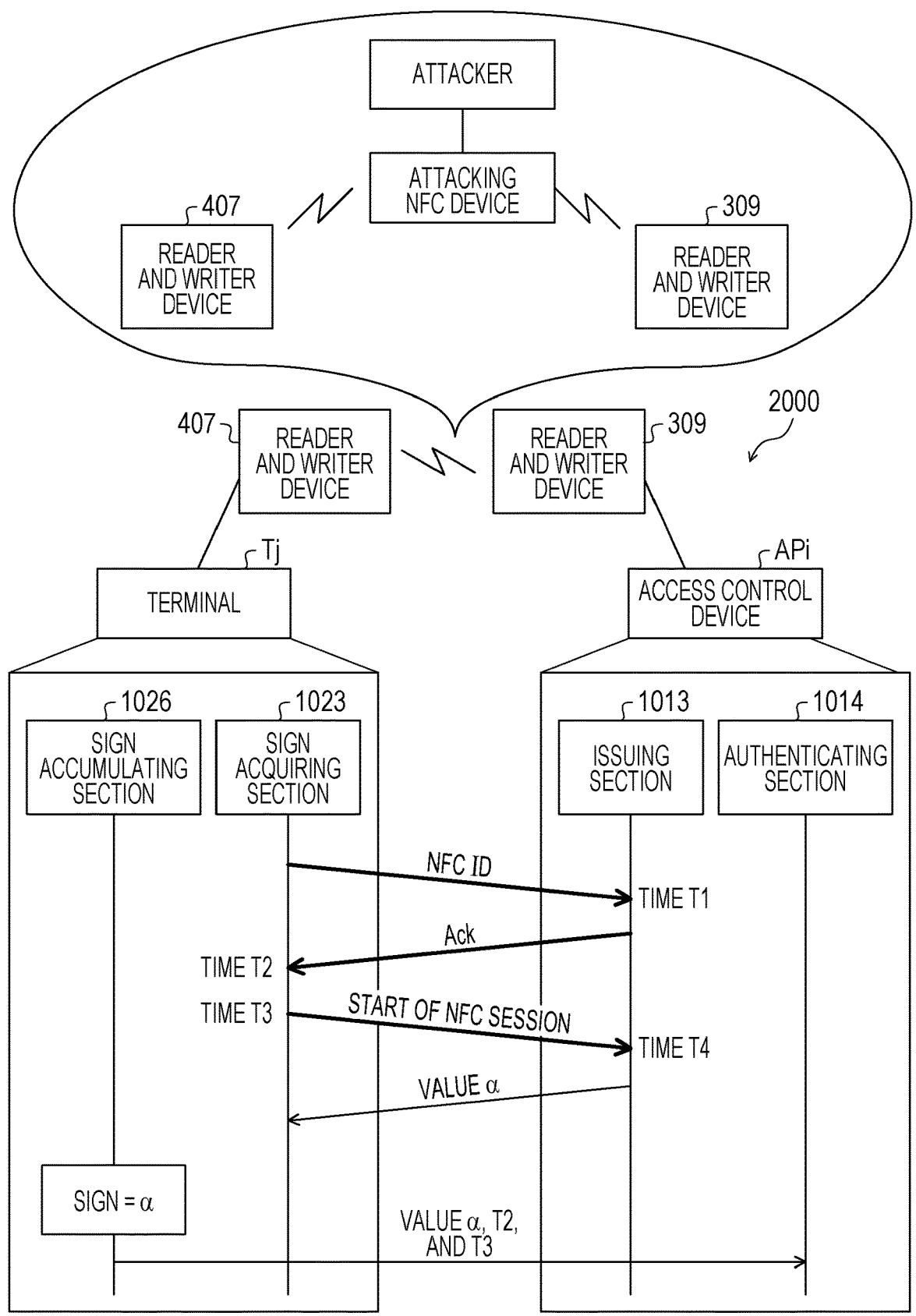
FIG. 20 is an explanatory diagram illustrating an example of operations of an access control system.

FIG. 20 is an explanatory diagram illustrating an example of operations of an access control system 2000. The user (student) of the terminal Tj holds the terminal Tj over the reader and writer device 309 of the access control device APi, whereby the reader and writer device 407 of the terminal Tj reads a sign written to a tag of the reader and writer device 309.

For example, the sign acquiring section 1023 of the terminal Tj causes the reader and writer device 407 to transmit a communication request via NFC to the reader and writer device 309 of the access control device APi. The communication request includes an NFC ID identifying the session, for example.

When the reader and writer device 309 receives the communication request via the NFC, the issuing section 1013 of the access control device APi records time T1 when the communication request has been received. Then, the issuing section 1013 of the access control device APi causes the reader and writer device 309 to transmit an acknowledgement (Ack) to the reader and writer device 407 of the terminal Tj.

When the reader and writer device 407 receives the Ack to the communication request via NFC, the sign acquiring section 1023 of the terminal Tj records the time when the Ack has been received. Then, the sign acquiring section 1023 of the terminal Tj causes the reader and writer device 407 to start an NFC session with the reader and writer device 309 of the access control device APi.

In this case, the sign acquiring section 1023 of the terminal Tj records time T3 when the NFC session has been established. The issuing section 1013 of the access control device APi records time T4 when the NFC session has been established. Then, the sign acquiring section 1023 of the terminal Tj causes the reader and writer device 407 to read a value α (password) written to the tag of the reader and writer device 309.

In this case, for example, the sign accumulating section 1026 of the terminal Tj treats, as authentication data, the acquired value a and information indicating the recorded time T2 and T3 and transmits a response including a key information item of the terminal Tj and the authentication data to the access control device APi. The information indicating the time T2 and T3 may not be included in the authentication data.

When the authenticating section 1014 of the access control device APi receives the response including the key information item and the authentication data from the terminal Tj, the authenticating section 1014 determines whether the terminal Tj is authorized based on the authentication data included in the response. For example, the authenticating section 1014 determines whether or not the value α included in the response matches the sign written to the tag of the reader and writer device 309.

In addition, the authenticating section 1014 determines whether or not a time period from the time when the communication request has been received from the terminal Tj via NFC to the time when the session with the terminal Tj has been established is equal to or longer than a predetermined time period. The predetermined time period may be arbitrarily set. For example, the predetermined time period is set to a time period (of several tens of microseconds) in which it may be determined that communication other than NFC or, for example, Internet Protocol (IP) communication may be executed via an attacking NFC device.

For example, the authenticating section 1014 determines whether or not time difference (T4−T1) between the time T1 and the time T4 is equal to or longer than a predetermined time period. When the value α matches the sign and the time difference (T4−T1) is shorter than the predetermined time period, the authenticating section 1014 determines that the terminal Tj is authorized. When the value α does not match the sign or the time difference (T4−T1) is equal to or longer than the predetermined time period, the authenticating section 1014 determines that the terminal Tj is not authorized.

The response received from the terminal Tj may include the information indicating the time T2 and T3. In this case, the authenticating section 1014 may determine whether or not time difference "(T4−T1)−(T3−T2)" obtained by subtracting the time difference (T3−T2) between the time T2 and the time T3 from the time difference (T4−T1) between the time T1 and the time T4 is equal to or longer than a predetermined time period. Thus, it may be possible to take into consideration of the time period (T3−T2) taken to establish the session and varying depending on a load of the terminal Tj.

As described above, when a time period from the time when the access control device APi according to the third embodiment receives a communication request from the terminal Tj via NFC to the time when the session between the access control device AP1 and the terminal Tj is established is equal to or longer than the predetermined time period, the access control device APi may determine that the terminal Tj is not authorized. Thus, it may be possible to detect a man-in-the-middle attack made using an attacking NFC device installed between the reader and writer device 309 of the access control device APi and the reader and writer device 407 of the terminal Tj.

Fourth Embodiment

Next, an access control system 2100 according to a fourth embodiment is described. Sections that are the same as those described in the first to third embodiments are indicated by the same reference symbols as described in the first to third embodiments, and a description and illustration thereof are omitted in some cases.

Figure 21:
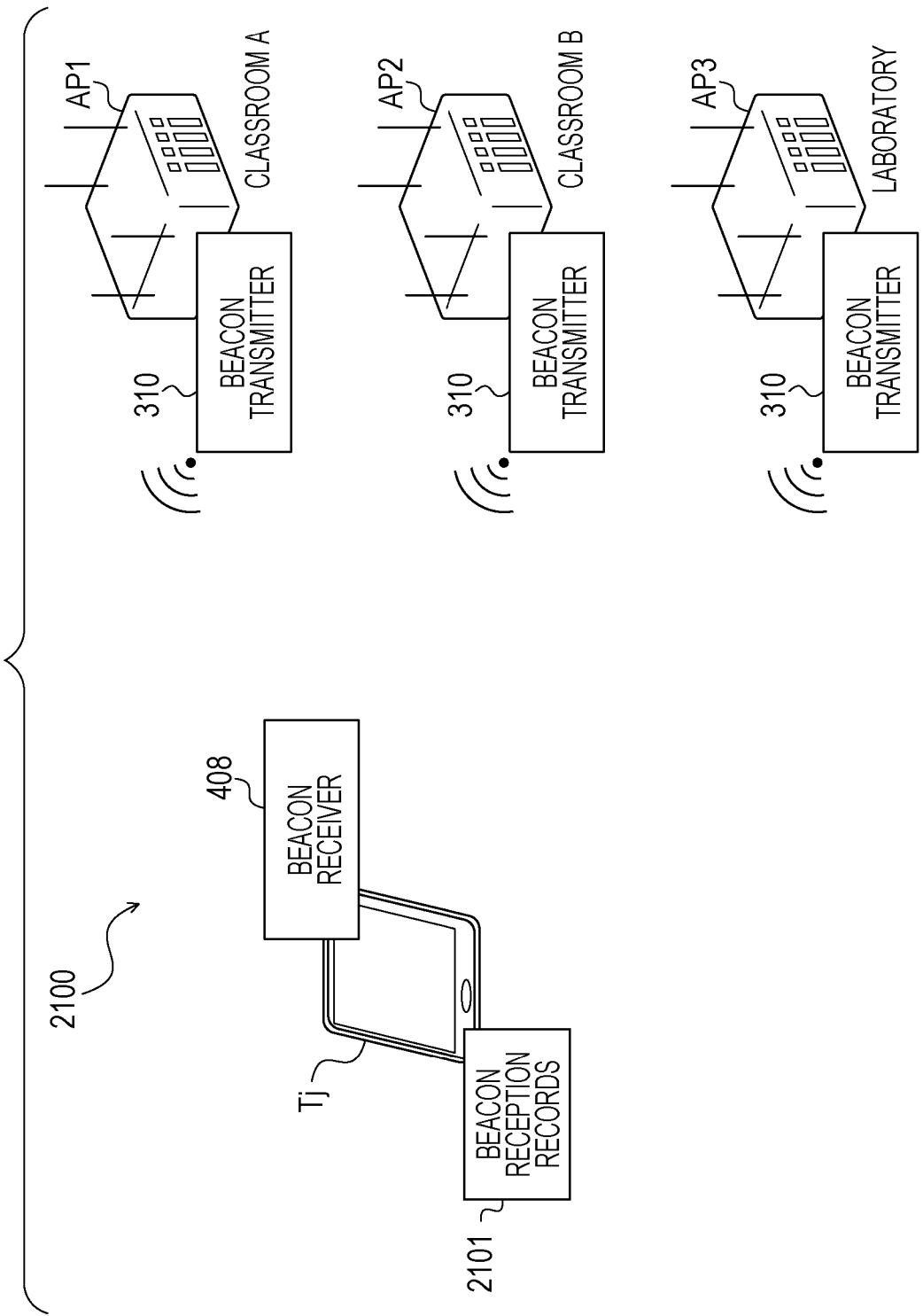
FIG. 21 is an explanatory diagram illustrating an example of operations of an access control system.

FIG. 21 is an explanatory diagram illustrating an example of operations of the access control system 2100. Access control devices AP1 to AP3 among access control devices AP1 to APn included in the access control system 2100 are described below as an example. It is assumed that the access control device AP1 is installed in a classroom A. It is assumed that the access control device AP2 is installed in a classroom B. It is assumed that the access control device AP3 is installed in a laboratory.

The access control devices AP1 to AP3 associate information indicating locations at which the access control devices AP1 to AP3 are installed with, for example, MAC addresses of the access control devices AP1 to AP3. The access control devices AP1 to AP3 store the associated information and the associated MAC addresses in storage devices that are memories 302, disks 304, or the like of the access control devices AP1 to AP3.

In the access control system 2100, the access control devices AP1 to AP3 periodically transmit beacon signals indicating information (beacon values) identifying the access control devices AP1 to AP3 from beacon transmitters 310 of the access control devices AP1 to AP3. The information (beacon values) identifying the access control devices AP1 to AP3 may be numbers uniquely identifying the access control devices AP1 to AP3 or may be the MAC addresses of the access control devices AP1 to AP3.

When the terminals Tj receive the beacon signals indicating the information (beacon values) identifying the access control devices AP1 to AP3 from the access control devices AP1 to AP3, the terminals Tj associate the beacon values with time when the terminals Tj have received the beacon signals, and the terminals Tj store the beacon values in beacon reception records 2101. The beacon reception records 2101 are enabled by the memories 402 of the terminals Tj, for example.

The beacon values are the information identifying the access control devices APi that have executed near field communication with the terminals Tj. The beacon values are information identifying the positions of the terminals Tj at the reception time associated with the beacon values.

The access control devices APi acquire the beacon reception records 2101 from the terminals Tj. In this case, the access control devices APi acquire the beacon reception records 2101 at any time during connections established between the access control devices APi and the terminals Tj. The access control devices APi, however, may acquire the beacon reception records 2101 in initial authentication of the terminals Tj or second or later authentication of the terminals Tj.

For example, the access control devices APi cause the beacon transmitters 310 to transmit, as signs, beacon signals (position requests) indicating requests to acquire information identifying the positions of the terminals Tj. When the beacon receivers 408 of the terminals Tj receive the beacon signals (position requests) from the access control devices APi, the terminals Tj read the information identifying the positions of the terminals Tj from the memories 402 or read, for example, the beacon reception records 2101 from the memories 402. Then, the terminals Tj transmit responses including the read information identifying the positions of the terminals Tj to the access control devices APi via the WLAN I/Fs 403 or transmit, for example, the beacon reception records 2101 to the access control devices APi via the WLAN I/Fs 403.

The access control devices APi receive the responses including the information (for example, the beacon reception records 2101) identifying the positions of the terminals Tj from the terminals Tj connected to the access control devices APi. Thus, the access control devices APi may acquire the information identifying the positions of the terminals Tj from the terminals Tj connected to the access control devices APi or may acquire, for example, the beacon reception records 2101 from the terminals Tj connected to the access control devices APi.

When the authenticating sections 1014 of the access control devices APi receive the positions of the terminals Tj from the terminals Tj connected to the access control devices APi, the authenticating sections 1014 identify chronological changes in the positions of the terminals Tj based on the information included in the responses and identifying the positions of the terminals Tj. For example, the authenticating sections 1014 may reference the beacon reception records 2101 of the terminals Tj and identify installation positions, identified from the beacon values, of the access control devices APi as the positions of the terminals Tj at the reception time associated with the beacon values. Then, the authenticating sections 1014 determine whether the terminals Tj are authorized based on the chronological changes in the identified positions of the terminals Tj.

An example in which whether the terminals Tj are authorized is determined based on the chronological changes in the positions of the terminals Tj is described with reference to FIG. 22. The example assumes that multiple terminals connected to an access control device APi are "terminals T1 to T3".

Figure 22:
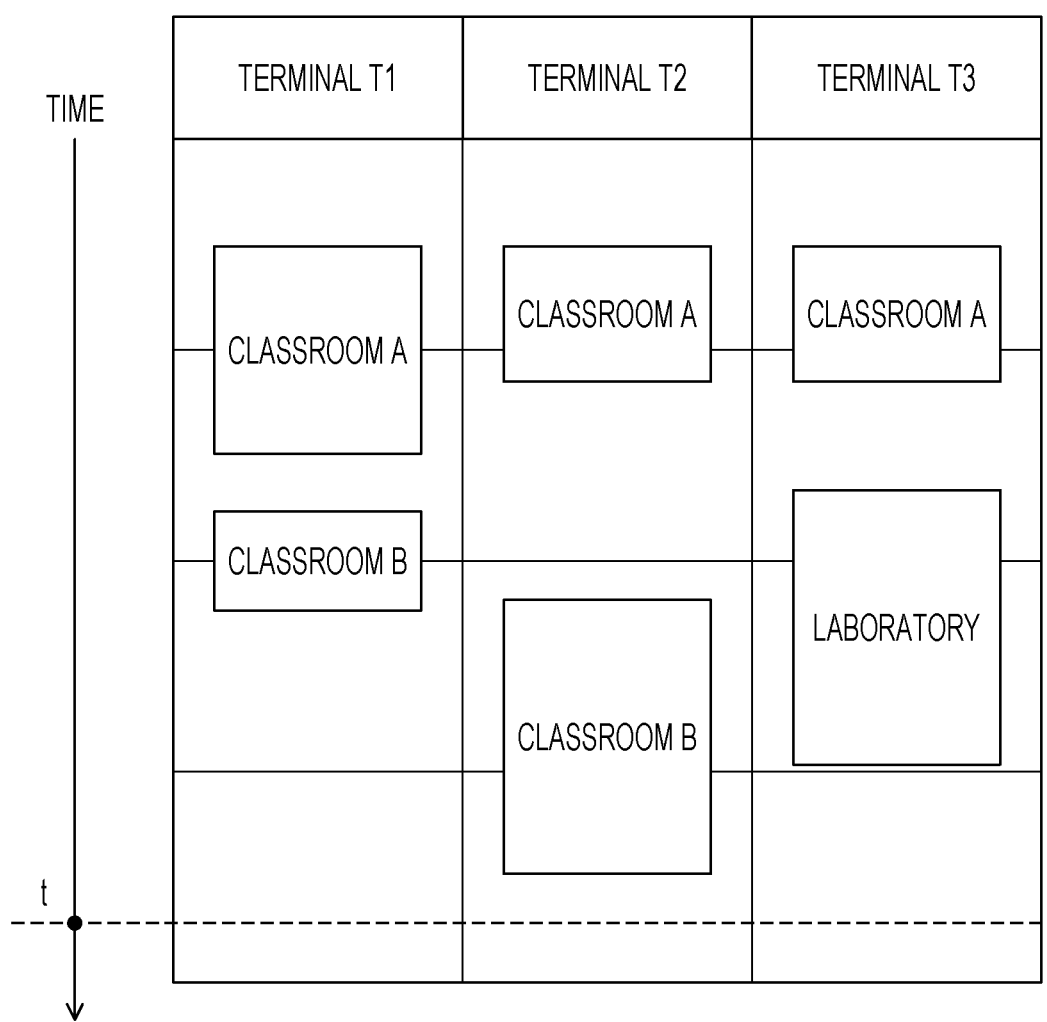
FIG. 22 is an explanatory diagram illustrating chronological changes in the positions of terminals.

FIG. 22 is an explanatory diagram illustrating chronological changes in the positions of the terminals T1 to T3. FIG. 22 illustrate the chronological changes in the positions, identified from beacon reception records 2101 of the terminals T1 to T3 connected to the access control device APi, of the terminals Tj. Whether the terminals Tj are authorized is determined at time t.

The access control device APi is connected to the terminals T1 to T3 at the time t and may be any of the access control devices AP1 to AP3 or may be an access control device APi other than the access control devices AP1 to AP3.

In this case, the authenticating section 1014 of the access control device APi compares the chronological changes in the positions of the terminals T1 to T3 with each other to determine whether the terminals T1 to T3 are authorized. In the example illustrated in FIG. 22, the position of the terminal T1 is changed from a position within the classroom A to a position within the classroom B. The position of the terminal T2 is changed from a position within the classroom A to a position within the classroom B. The position of the terminal T3 is changed from a position within the classroom A to a position within the laboratory.

The chronological change in the position of the terminal T3 is different from the chronological changes in the positions of the terminals T1 and T2. For example, it is expected that chronological changes in the positions of terminals of all students of the same class are the same. If a chronological change in the position of a terminal of a certain student among multiple students using the wireless LAN is different from chronological changes in the positions of terminals of the other students, the certain student may use the wireless LAN in an unauthorized manner.

The authenticating section 1014 determines that the terminal T3 of which the chronological change in the position is different from the chronological changes in the positions of the other terminals T1 and T2 is not authorized. When the authenticating section 1014 determines that the terminal T3 is not authorized, the authenticating section 1014 outputs an alert related to the terminal T3. The alert indicates that the terminal T3 is likely to make unauthorized access to the wireless LAN. An output destination of the alert is, for example, the manager terminal 201.

When the authenticating section 1014 determines that the terminal T3 is not authorized, the authenticating section 1014 may execute a process of disconnecting a connection to the terminal T3. When the authenticating section 1014 determines that the terminal T3 is not authorized, the authenticating section 1014 may delete a key information item (public key) of the terminal T3 from the sign management DB 500 and initialize a firstAuth flag (to "true").

As described above, the access control device APi according to the fourth embodiment may detect and remove a terminal Tj making unauthorized access based on correlations of past positions of terminals Tj (or terminals Tj that have transmitted requests for connections to the access control device APi) connected to the access control device APi.

The access control method described in the fourth embodiment may be enabled by causing a computer such as a personal computer or a workstation to execute an access control program prepared in advance. The access control program is recorded in a computer-readable recording medium such as a hard disk, a flexible disk, a compact disc-ROM (CD-ROM), a magneto-optical (MO) disk, a digital versatile disc (DVD), or a Universal Serial Bus (USB) memory. The access control program is read by the computer from the recording medium and executed by the computer. The access control program may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An access control device comprising:
a memory; and
a processor coupled to the memory and the processor configured to:
receive a request for a connection via wireless communication from a terminal, issue a password from a first device for supporting a reading scheme for the terminal in response to a reception of the request for the connection, and transmit, to the terminal, a first program for generating a key information item of the terminal and acquiring authentication data corresponding to the password read by the reading scheme for the terminal,
receive a response including the key information item and the authentication data from the terminal and determine whether the terminal is authorized based on the authentication data included in the response, and
associate the key information item included in the response with identification information of the terminal and execute a process of establishing the connection to the terminal when the processor determines that the terminal is authorized.

2. The access control device of claim 1,
wherein the processor is further configured to:
register the association of the key information item included in the response with the identification information of the terminal,
determine whether the key information item associated with the identification information of the terminal is already registered in response to the reception of the request for the connection via the wireless communication from the terminal,
transmit, to the terminal, a second program for generating authentication data for authentication using the key information item when the key information item is already registered,
receive a response including authentication data from the terminal and determine whether the terminal is authorized based on the authentication data included in the response and the key information item, and
execute a process of establishing the connection to the terminal when the processor determines that the terminal is authorized.

3. The access control device of claim 1,
wherein the first device is a display device, and
wherein the reading scheme for the terminal is a scheme of reading a password displayed by the first device and entered by an entry operation with an input device of the terminal in response to the reception of the entered password.

4. The access control device of claim 1,
wherein the first device is a transmitter configured to transmit a beacon signal via first near field communication whose communication range is smaller than that of the wireless communication, and
wherein the reading scheme for the terminal is a scheme of reading a password indicating the beacon signal transmitted by the first device and received by the terminal in response to the reception of the beacon signal.

5. The access control device of claim 1,
wherein the first device is a reader and writer device configured to read and write data via second near field communication whose communication range is smaller than that of the wireless communication, and
wherein the reading scheme for the terminal is a scheme of reading a password written to the first device.

6. The access control device of claim 1,
wherein the password issued from the first device indicates a password, and
wherein when the processor receives the response including the key information item and the authentication data from the terminal, and the authentication data included in the response matches the password issued from the first device, the processor determines that the terminal is authorized.

7. The access control device of claim 1,
wherein the first program is for acquiring information indicating at least one of a size of the first program, execution time of the first program, and a hash value of the first program, and
wherein when the processor receives the response further including the information indicating at least one of the size of the first program, the execution time of the first program, and the hash value of the first program, the processor determines whether the terminal is authorized based on the authentication data included in the response and the information included in the response and indicating the at least one of the size of the first program, the execution time of the first program, and the hash value of the first program, the first program being executed by the terminal.

8. The access control device of claim 7,
wherein the processor determines that the terminal is not authorized when the size, included in the response, of the first program executed by the terminal does not match the size of the first program transmitted to the terminal.

9. The access control device of claim 7,
wherein the processor determines that the terminal is not authorized when the hash value, included in the response, of the first program executed by the terminal does not match a hash value of the first program transmitted to the terminal.

10. The access control device of claim 7,
wherein the processor determines that the terminal is not authorized when a time difference between the execution time, included in the response, of the first program executed by the terminal and a time when the processor transmits the first program to the terminal is equal to or longer than a predetermined time period.

11. The access control device of claim 5,
wherein the processor determines that the terminal is not authorized when a time period from a time when the processor receives a communication request via second near field communication from the terminal to a time when a session between the access control device and the terminal is established is equal to or longer than a predetermined time period.

12. The access control device of claim 4,
wherein the processor is further configured to
issue a password requesting information identifying a position of the terminal from the first device,
receive a response including information identifying a position of each of multiple terminals connected to the access control device from the corresponding terminal, and determine chronological changes in positions of the multiple terminals based on the information included in the response and identifying the positions of the multiple terminals,
determine whether the multiple terminals are authorized based on the determined chronological changes in the positions of the multiple terminals, and output, upon determining that any of the multiple terminals is not authorized, an alert related to the terminal.

13. The access control device of claim 1,
wherein the password issued from the first device indicates a request for a facial image,
wherein the first program is for acquiring a facial image of a user of the terminal as the authentication data,
wherein the processor is further configured to
receive a response including the key information item and the facial image of the user from the terminal and transmit the facial image included in the response to a specific terminal, and
receive a response from the specific terminal and determine whether the terminal is authorized based on a detail of the response from the specific terminal.

14. A method executed by a computer, comprising:
receiving a request for a connection via wireless communication from a terminal;
issuing a password from a device for supporting a reading scheme for the terminal in response to a reception of the request for the connection;
transmitting, to the terminal, a program for generating a key information item of the terminal and acquiring authentication data corresponding to the password read by the reading scheme for the terminal;
receiving a response including the key information item and the authentication data from the terminal and determine whether the terminal is authorized based on the authentication data included in the response, and
associating the key information item included in the response with identification information of the terminal and execute a process of establishing the connection to the terminal when the processor determines that the terminal is authorized.

15. An access control device to a network comprising:
a memory; and
a processor coupled to the memory and the processor configured to:
receive a request for a connection to the network via wireless communication from a terminal,
transmit, via near-field communication (NFC), a password and a first program for generating encryption key information to the terminal in response to a reception of the request for the connection,
acquire, from the terminal, encryption key information and authentication data generated using the password,
determine whether the terminal is authorized to access the network based on the authentication data,
associate the encryption key information with identification information of the terminal, and
execute a process of establishing the connection to the network when the processor determines that the terminal is authorized.

* * * * *